United States Patent
Muneta

(10) Patent No.: US 7,486,997 B2
(45) Date of Patent: Feb. 3, 2009

(54) SAFETY CONDITION SETTING SUPPORT DEVICE, PROGRAM PRODUCT AND DEVICE CONTROL METHOD FOR OBTAINING SAFETY CONDITION FOR SAFETY NETWORK

(75) Inventor: Yasuo Muneta, Kyoto (JP)

(73) Assignee: OMRON Corporation, Kyoto (JP)

( * ) Notice: Subject to any disclaimer, the term of this patent is extended or adjusted under 35 U.S.C. 154(b) by 634 days.

(21) Appl. No.: 11/220,869

(22) Filed: Sep. 6, 2005

(65) Prior Publication Data
US 2006/0040792 A1 Feb. 23, 2006

Related U.S. Application Data

(63) Continuation of application No. PCT/JP03/02702, filed on Mar. 7, 2003.

(30) Foreign Application Priority Data

Mar. 7, 2002 (JP) .............................. 2002-62593

(51) Int. Cl.
G05B 11/01 (2006.01)
(52) U.S. Cl. .................. 700/21; 700/2; 700/3; 700/79; 700/83; 700/255; 714/724
(58) Field of Classification Search ..................... 700/2, 700/3, 4, 17, 21, 79, 83, 255
See application file for complete search history.

(56) References Cited

U.S. PATENT DOCUMENTS 5,280,622 A * 1/1994 Tino ............................ 700/255
6,205,362 B1 3/2001 Eidson
7,050,860 B2 * 5/2006 Muneta et al. ................. 700/3

(Continued)

FOREIGN PATENT DOCUMENTS

JP 06-119417 4/1994

(Continued)

OTHER PUBLICATIONS

Japan patent application No. 2002-062593, Examination Report dated Jun. 5, 2007.

(Continued)

Primary Examiner—Albert Decady
Assistant Examiner—Douglas S Lee
(74) Attorney, Agent, or Firm—Weaver Austin Villeneuve & Sampson LLP

(57) ABSTRACT

A safety condition setting support device is used for a safety network to which an input device and an output device are connected and the output device serves to stop a controlled apparatus based on a detection signal outputted from the input device when the input device has detected a danger condition. The support device serves to set safety conditions for stopping the controlled apparatus within a specified time period and includes an apparatus data memory for storing data related to internal processing times of safety devices connected to the safety network including the input and output devices, data obtaining device obtaining connection data showing connection relationship among the safety devices and transmission intervals among the safety devices or a safety distance between the input device and the controlled apparatus, and a calculating device for obtaining the safety conditions based on these obtained data.

20 Claims, 19 Drawing Sheets

U.S. PATENT DOCUMENTS

| | | | |
|---|---|---|---|
| 7,120,505 B2 * | 10/2006 | Nakamura et al. | 700/3 |
| 7,391,178 B2 * | 6/2008 | Tanaka et al. | 318/568.2 |
| 2004/0210322 A1 * | 10/2004 | Takeuchi et al. | 700/21 |
| 2005/0017875 A1 * | 1/2005 | Nakayama et al. | 340/870.07 |
| 2006/0259837 A1 * | 11/2006 | Teranishi et al. | 714/724 |

FOREIGN PATENT DOCUMENTS

| | | |
|---|---|---|
| JP | 06-175714 | 6/1994 |
| JP | 11-073210 | 3/1999 |
| JP | 11-219099 | 8/1999 |
| JP | 11-265206 | 9/1999 |
| JP | 2000-276508 | 10/2000 |
| JP | 2001-209407 | 8/2001 |
| JP | 2001-259898 | 9/2001 |

OTHER PUBLICATIONS

International Search Report, Patent Application No. PCT/JP03/02702, mailed May 27, 2003.

Japan patent application No. 2002-062593, Examination Report dated Aug. 10, 2006.

* cited by examiner

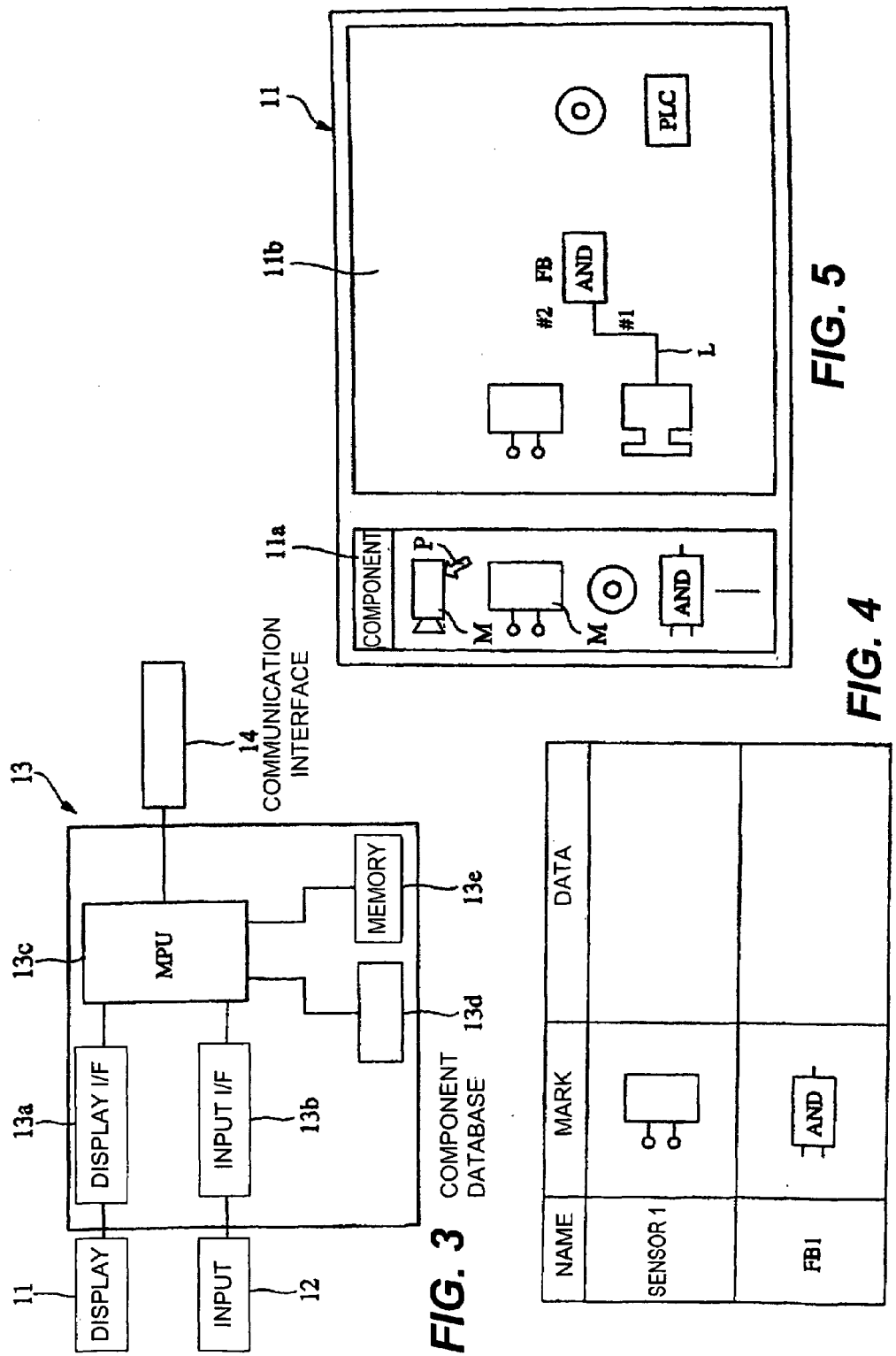

| CONNECTION NO. | SENDER | RECEIVER | DATA SIZE |
|---|---|---|---|
| C1 | SENSOR 1 - #1 | FB - #1 (PLC1 - #1) | 1 |
| C2 | SENSOR 2 - #1 | FB - #2 (PLC1 - #2) | 1 |
| C3 | FB - #3 (PLC1 - #3) | MOTOR - #1 | 1 |
*FIG. 13*
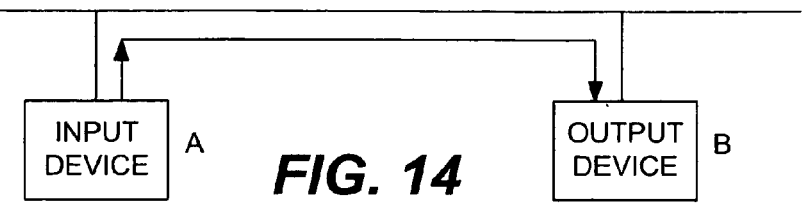
*FIG. 14*
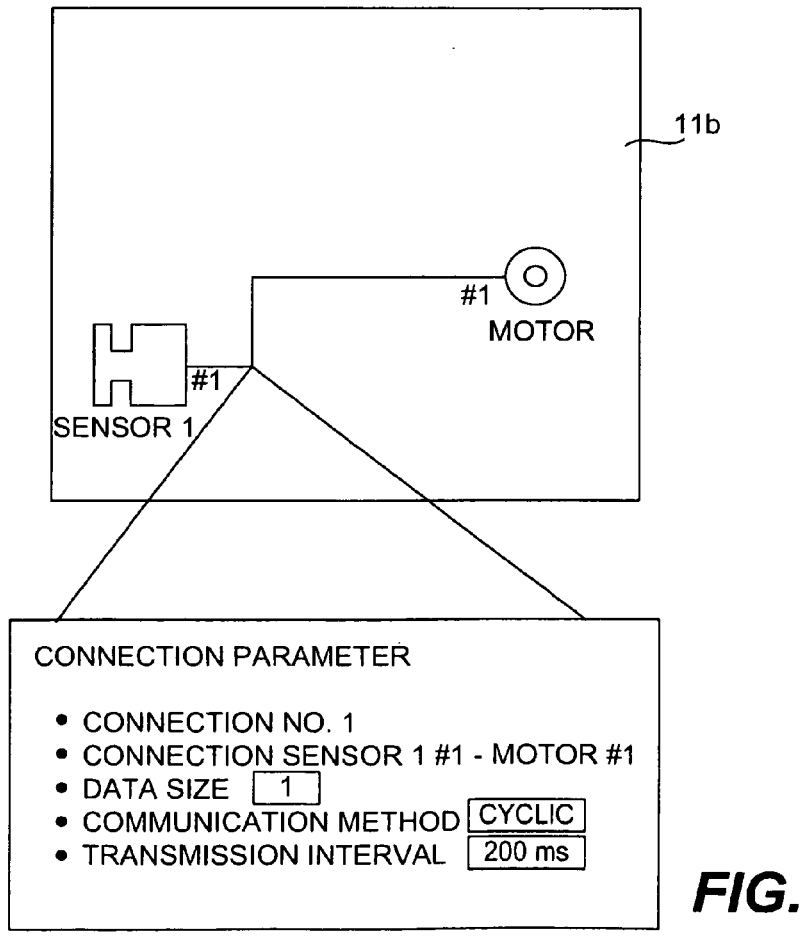
*FIG. 18*

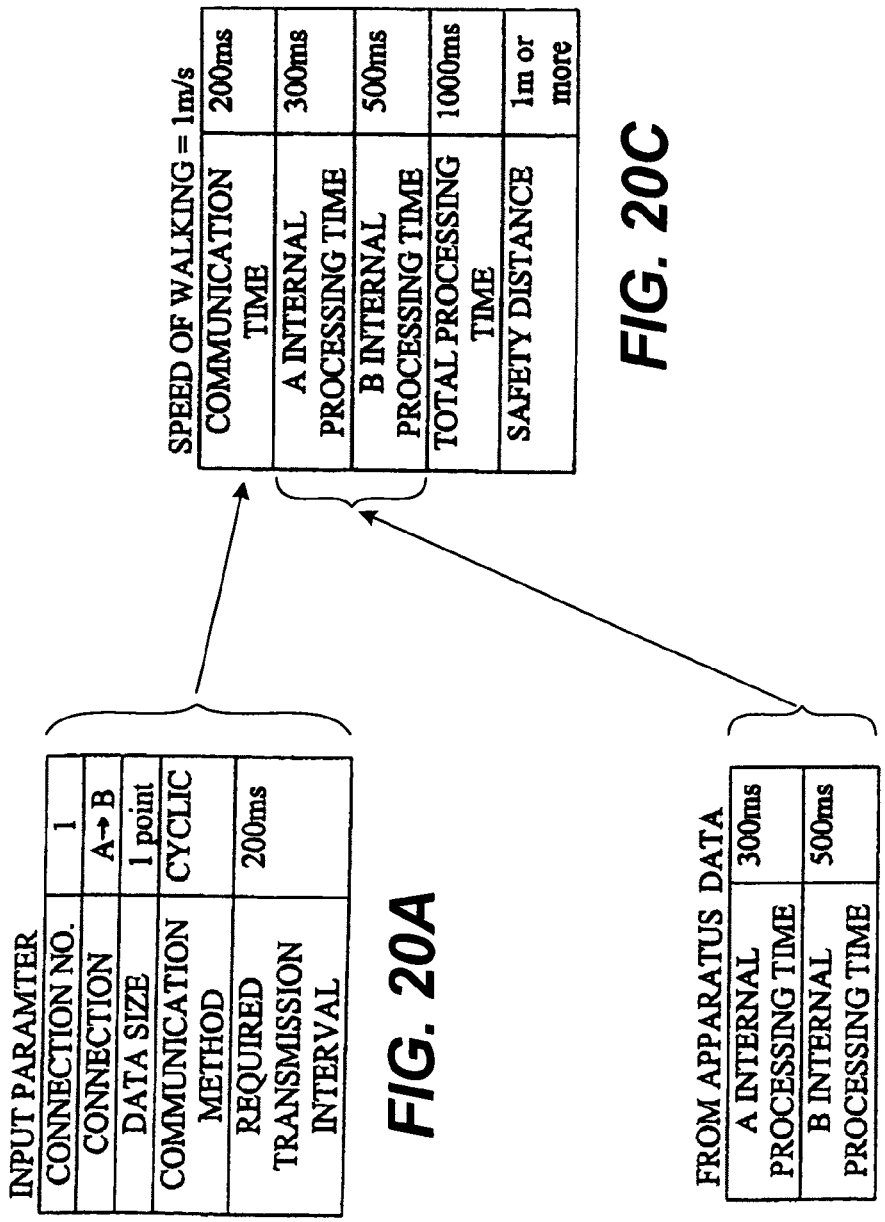

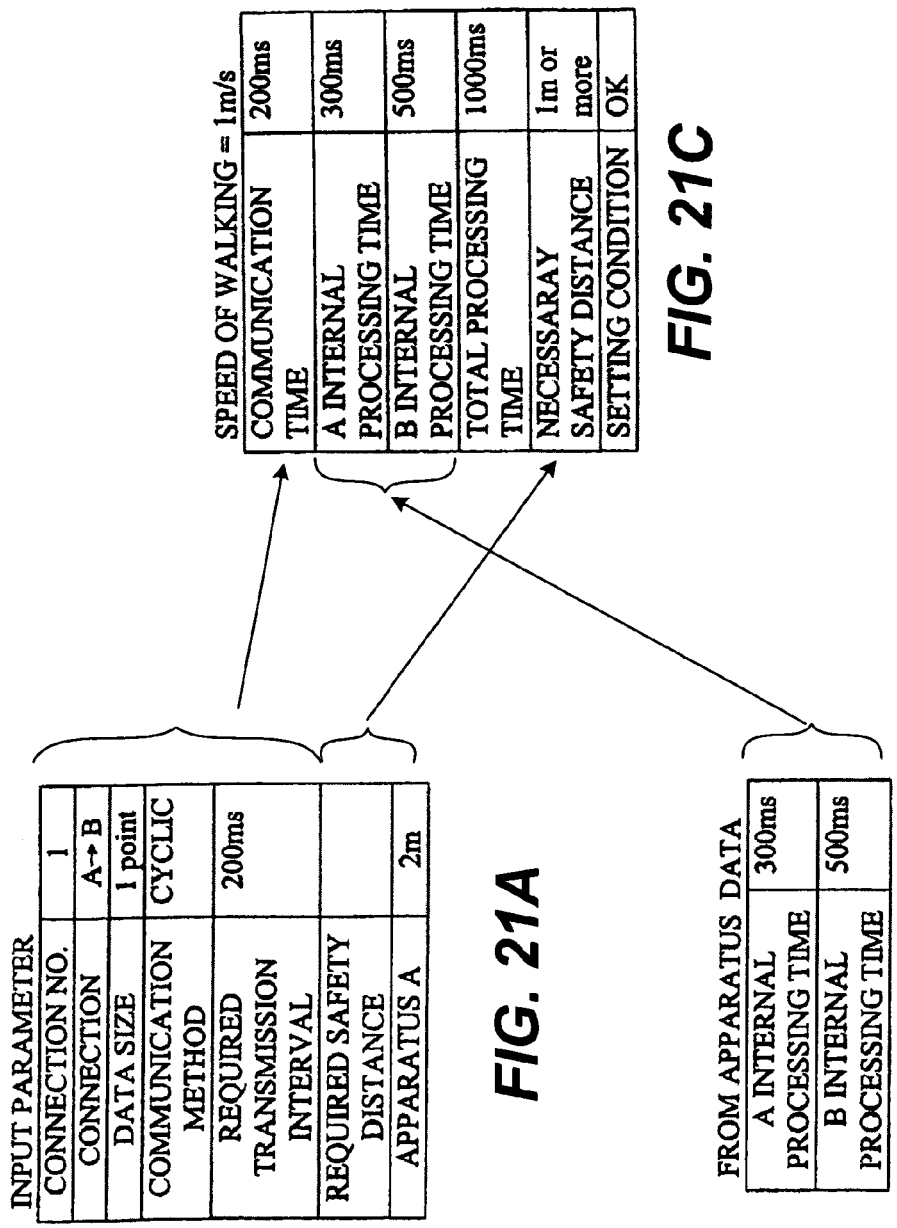

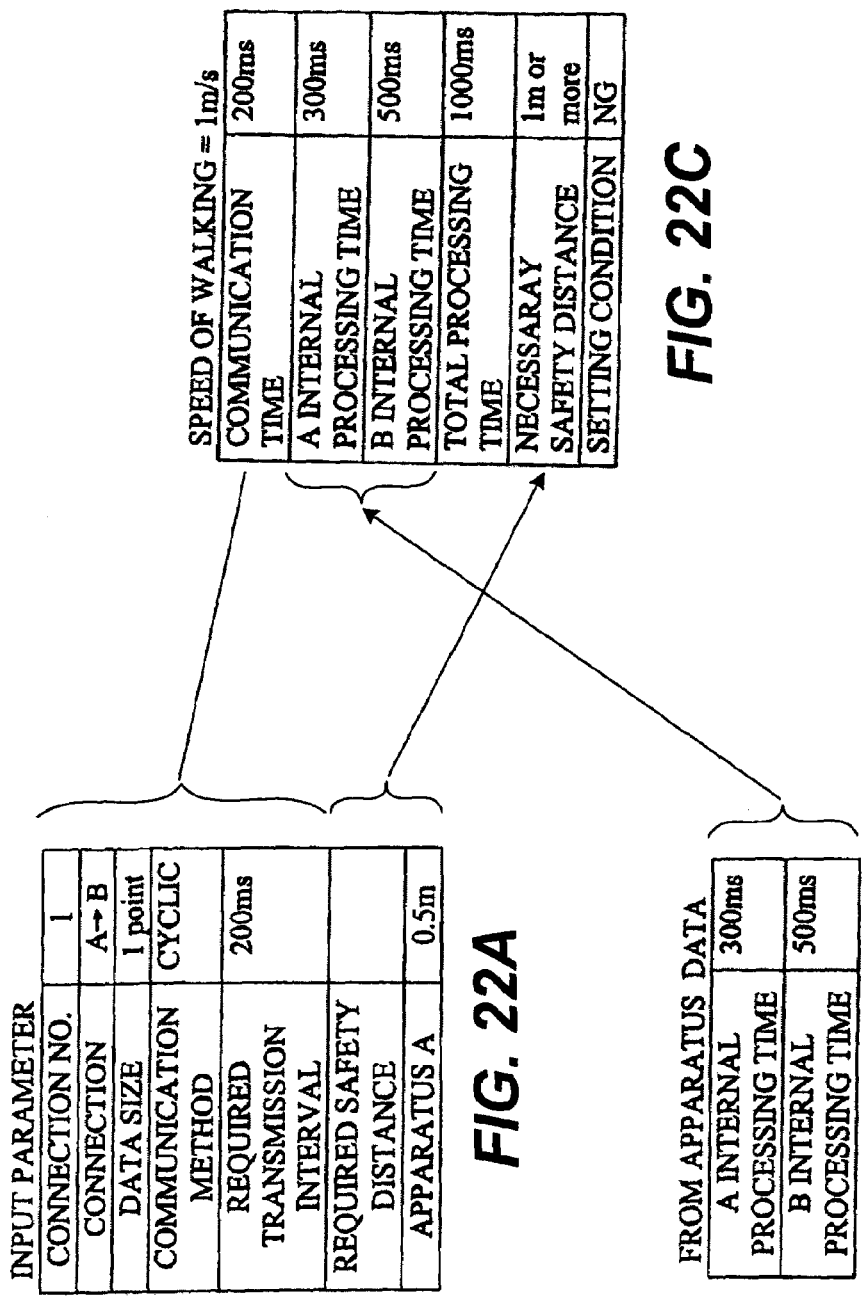

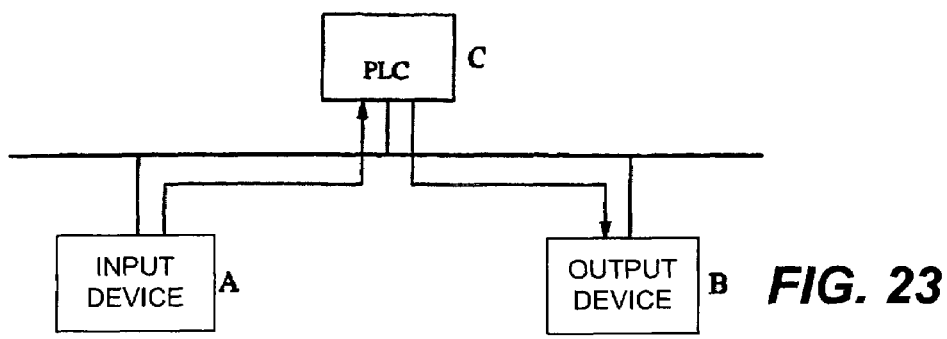

| INPUT PARAMTER | |
|---|---|
| CONNECTION NO. | 2 |
| CONNECTION | A→C |
| DATA SIZE | 1 point |
| COMMUNICATION METHOD | CYCLIC |
| REQUIRED TRANSMISSION INTERVAL | 200ms |

| CONNECTION NO. | 3 |
|---|---|
| CONNECTION | C→B |
| DATA SIZE | 1 point |
| COMMUNICATION METHOD | CYCLIC |
| REQUIRED TRANSMISSION INTERVAL | 200ms |

FIG. 24B

| FROM APPARATUS DATA | |
|---|---|
| A INTERNAL PROCESSING TIME | 300ms |
| B INTERNAL PROCESSING TIME | 500ms |
| C INTERNAL PROCESSING TIME | 1000ms |

FIG. 24C

| SPEED OF WALKING = 1m/s | |
|---|---|
| COMMUNICATION TIME | 400ms |
| A INTERNAL PROCESSING TIME | 300ms |
| B INTERNAL PROCESSING TIME | 500ms |
| C INTERNAL PROCESSING TIME | 1000ms |
| TOTAL PROCESSING TIME | 2200ms |
| SAFETY DISTANCE | 2.2m or more |

FIG. 25A

| INPUT PARAMTER | |
|---|---|
| CONNECTION NO. | 4 |
| CONNECTION | A→C |
| DATA SIZE | 1 point |
| COMMUNICATION METHOD | CYCLIC |
| REQUIRED TRANSMISSION INTERVAL | 200ms |

| CONNECTION NO. | 5 |
|---|---|
| CONNECTION | C→B |
| DATA SIZE | 1 point |
| COMMUNICATION METHOD | CYCLIC |
| REQUIRED TRANSMISSION INTERVAL | 200ms |
| REQUIRED SAFETY DISTANCE | |
| APPARATUS A | 2m |

FIG. 25B

| FROM APPARATUS DATA | |
|---|---|
| A INTERNAL PROCESSING TIME | 300ms |
| B INTERNAL PROCESSING TIME | 500ms |
| C INTERNAL PROCESSING TIME | 1000ms |

FIG. 25C

SPEED OF WALKING = 1m/s

| A INTERNAL PROCESSING TIME | 300ms |
|---|---|
| B INTERNAL PROCESSING TIME | 500ms |
| C INTERNAL PROCESSING TIME | 1000ms |
| COMMUNICATION TIME | 400ms |
| TOTAL PROCESSING TIME | 2200ms |
| REQUIRED SAFETY DISTANCE | 2.2m or more |
| SETTING CONDITION | NG |

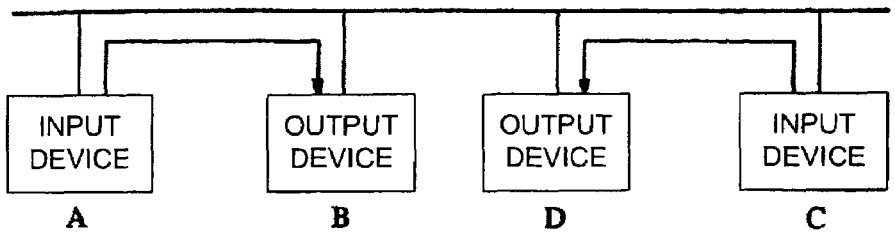

FIG. 26

INPUT PARAMTER 1

| CONNECTION NO. | 1 |
|---|---|
| CONNECTION | A→B |
| DATA SIZE | 1 point |
| COMMUNICATION METHOD | CYCLIC |
| REQUIRED TRANSMISSION INTERVAL | 200ms |

INPUT PARAMTER 2

| CONNECTION NO. | 2 |
|---|---|
| CONNECTION | C→D |
| DATA SIZE | 1 point |
| COMMUNICATION METHOD | CYCLIC |
| REQUIRED TRANSMISSION INTERVAL | 200ms |

FIG. 27A

FROM APPARATUS DATA

| A INTERNAL PROCESSING TIME | 300ms |
|---|---|
| B INTERNAL PROCESSING TIME | 500ms |
| C INTERNAL PROCESSING TIME | 500ms |
| D INTERNAL PROCESSING TIME | 700ms |

FIG. 27B

SPEED OF WALKING = 1m/s
BETWEEN A AND B

| COMMUNICATION TIME | 200ms |
|---|---|
| A INTERNAL PROCESSING TIME | 300ms |
| B INTERNAL PROCESSING TIME | 500ms |
| TOTAL PROCESSING TIME | 1000ms |
| SAFETY DISTANCE | 1m or more |

FIG. 27C

BETWEEN C AND D

| COMMUNICATION TIME | 200ms |
|---|---|
| C INTERNAL PROCESSING TIME | 500ms |
| D INTERNAL PROCESSING TIME | 700ms |
| TOTAL PROCESSING TIME | 1400ms |
| SAFETY DISTANCE | 1.4m or more |

FIG. 27D

SAFETY CONDITION SETTING SUPPORT DEVICE, PROGRAM PRODUCT AND DEVICE CONTROL METHOD FOR OBTAINING SAFETY CONDITION FOR SAFETY NETWORK

This application is a continuation of International Application No. PCT/JP2003/02702, filed Mar. 7, 2003, which claims priority based on Japanese Patent Application 2002-62593 filed Mar. 7, 2002.

BACKGROUND OF THE INVENTION

This invention relates to a safety condition setting support device and a computer readable medium program product, as well as a method of controlling a device for obtaining safety conditions for a safety network.

As is well known, a network system connecting a programmable controller (PLC) and a slave through a network such as a device network is structured for a factory automation (FA) system. The slave is provided with a plurality of I/O units and sensors, relays and apparatus of various other kinds and connected to these I/O units such that sensing data detected by input devices (such as switches and sensors) connected to the slave, for example, are taken in by the PLC through the network. The PLC serves to analyze the obtained sensing data and to transmit control commands to the output devices (such as relays, valves and actuators) to be operated on the basis of these sensing results.

On the other hand, safety systems are recently coming to be introduced into the control by a PLC. This is to say that not only the PLC and individual apparatus but also the network itself is coming to be formed incorporating safety (failsafe) functions. In the above, the failsafe functions include duplexing the CPU and other operating parts such that correct outputs will be made, pressing an emergency stop button in the case of a network abnormality (such that normal communications cannot be made), and activating a failsafe function to stop an action for safety if a sensor such as a light curtain detects the entry of a person (or a part of a person's body) and a safety system cannot maintain a safe condition.

In the case of a safety system of the latter type making use of a network, the positional relationship (including safety distance) between the machine equipment to be controlled by a related output device and an input device becomes an important factor in order to carry out the failsafe function. FIG. 1 shows a robot as an example of machine equipment controlled by an output device where its range of operation becomes a danger area 1. In this situation, a pair consisting of a light transmitter 2a and a light receiver 2b is set as an input device in front of this danger area 1. It will be assumed that walls, etc. are so set up that a worker 3 will have to pass between this light transmitter 2a and the light receiver 2b in order to penetrate into the danger area 1.

This means that the worker 3 will necessarily pass through the optical axis 4 of the light transmitted from the light transmitter 2a before reaching the danger area 1. When the light receiver 2b becomes unable to receive light from the light transmitter 2a, the safety system for this case concludes that the worker 3 has passed this optical axis 4 and outputs a warning signal. A detection signal is eventually transmitted to the output device through the network and the output device serves to stop the operations of the machine equipment functioning within the danger area 1.

In other words, there is a certain delay from the moment when the light receiver 2b detects the worker 3 passing until the machine equipment is actually stopped. This delay necessarily includes at least the total of the internal processing times by the input device and the output device and the communication times of various data on the network.

Thus, if the aforementioned total time is shorter than the time required for the worker 3 to reach the danger area 1 after passing between the light transmitter 2a and the light receiver 2b (the distance of walking/the speed of walking), the machine equipment can be stopped before the worker 3 reaches the danger area 1. When the system is designed, therefore, this is taken into consideration such that the internal processing times of the input and output devices are set to become shorter or the distance of walking (from the position of detection by the input device to the danger area 1) such that the system (machine equipment) can be dependably stopped at the time of an abnormality.

If the necessary distance between the position of detection by the input device and the danger area 1 for carrying out a safety operation is defined as the minimum safety distance S, this may be obtained as $$S = K \times T$$

where K is the speed of walking such as 1 m/sec and T is the time required for stopping the operations (the aforementioned total time), or $$S = K \times T + C$$

where C is an additional distance.

Prior art systems of this type had problems of the following kind.

For example, when an actual safety system is be built by using a network, the delay time related to the communication and the processing times by the input and output devices must be reflected in the safety distance, as explained above. It is troublesome, however, to identify the devices that form the network system related to the machine equipment and to obtain times related to them. Moreover, there are many system structures even if one merely considers the communication route between the input and output devices because there are situations, for example, where a detection signal is directly transmitted from the input device to the output device as well as where it is first taken in by the PLC and processed by it and then the processed result is transmitted to the output device. Thus, it is cumbersome to determine the network routine for which a safety distance is now being sought and to consider the delay in the communication time based on it.

In view of the above, it is possible to consider all delays related to the network to be uniform and for the user to set up all machine apparatus by calculating safety distances for them all by taking into consideration their maximum delay but if the delay times and the processing times are uniform, there is no flexibility in the application and applicable applications become limited.

If the fastest response time (internal processing time) is required of all apparatus, furthermore, this will require an excessive communication capability of the safety network to be used and this will adversely affect the cost.

SUMMARY OF THE INVENTION

It is therefore an object of this invention in view of the above to provide a safety condition setting support device and a computer readable medium program product as well as a method of controlling a device for obtaining safety conditions for a safety network such that various parameters (such as safety distances and intervals for signal transmission from various apparatus) for constructing a safety network can be set even in situations where the specifications, etc of each apparatus are not fully understood, that no excessive communication capability or unnecessary safety distance will be set, that data for constructing a realizable safety network can be provided, and that a safety network system can be constructed while the whole system structure can be grasped visually and in a sensory manner by carrying out processes by following a displayed screen.

A safety condition setting support device according to this invention is for a safety network for an output device to stop a controlled device, when an input device has detected a danger condition, based on a detection signal outputted by this input device and serves to set safety conditions for carrying out this stopping process within a specified time. Such a safety condition setting support device according to this invention may be characterized as comprising an apparatus data memory that stores data related to internal processing times of safety devices including the input device and the output device that are connected to the safety network, data obtaining means for obtaining connection data showing connection relationship among the safety devices and at least either of transmission intervals among the safety devices and a safety distance between the input device and the controlled apparatus and calculating means for obtaining the safety conditions based on the connection data, the internal processing times and at least either of the transmission intervals among the safety devices and the safety distance.

The safety condition setting support device of this invention may be in the form of a tool. In the above, the apparatus data memory may be realized as a component database (as shown at 13d in FIG. 3), the connection data are for identifying which and which of the safety devices are mutually connected, the data obtaining means may be adapted to read out what have already been created and have been stored in a specified memory means or to obtain what have been outputted from an input means, and the danger condition is a condition in which it is no longer possible to maintain a safety condition.

Where there is a danger area within the operating range of a controlled apparatus (or machine equipment), the safety network must be able to prevent a person from entering this danger area while the controlled apparatus is in operation. Thus, as the input device detects a person approaching the danger area, it must stop the operation of the controlled apparatus by activating the output device before the person reaches the danger area, that is, it must operate the safety function at the time of an abnormality such that the system operates on a safe side to stop the operation.

In order to dependably carry out this safety operation, there are two methods to be considered, one being to shorten as much as possible the total time from when the input device detects an abnormal condition until the output device issues a stop command to the controlled apparatus and stops it and the other being to detect the abnormality (such as the invasive entry of a person) at a position as far as possible from the danger area. In actual applications, a decision is suitably made according to the mutual relationship between these two, that is, if the total time is determined, the minimum distance (safety distance) to be maintained between the detection position by the input device and the danger area can be determined from the walking speed of the person, etc. In reverse, if the distance between the detection position by the input device and the danger area is fixed, it is possible to obtain the aforementioned total time for making it equal to a safety distance.

Since the internal processing times of the safety devices are stored in the apparatus data memory according to this invention, a total processing time required for transmitting a detection signal indicating an abnormal condition can be obtained easily by adding the processing times by the connected safety devices and the transmission interval. Thus, if the transmission interval is given, since the total processing time can be obtained therefrom as explained above, it is possible to calculate a safety distance (or its recommended value). If the transmission interval is unknown but the safety distance has been inputted, on the other hand, it is possible to obtain a transmission interval (or its recommended value). If both the transmission interval and the safety distance have been inputted, it is possible to determine whether the safety condition is satisfied by the inputted conditions.

It is preferable that the safety condition setting support device of this invention be provided with the function of downloading these safety conditions that have been set to the safety devices. Although this function is not indispensable, transmission intervals and other data that are necessary for constructing a safety network can thus be transmitted to each of the safety devices by downloading.

The downloading may be done either directly or indirectly. Direct downloading means to directly extending a wire or to directly transmit data through the network to the object safety device for loading. Indirect downloading means to load the data to the object safety device through another apparatus.

It is further preferable that the safety condition setting support device of this invention also comprise a display part and a display data memory that stores display data related to the safety devices, that the safety condition setting support device be adapted to display on the display part connecting lines which connect those of specified ones of the safety devices that are displayed inside a work area on the display part and specified through an input part by using the display data stored in the display data memory, and that the calculating means obtain the safety conditions by reading out the internal processing times of the safety devices connected by the connecting lines.

With a support device thus structured, display data representing the safety devices are displayed in the work area of its display device and the user can select those that are transmitting and receiving data on the screen to make a connection between the selected devices. Since such a connecting line is actually displayed on the screen, the user can visually ascertain from such lines which and which of the devices are connected together. Thus, the safety conditions can be obtained by reading out the internal processing times of these devices and obtaining at least either of the safety distance and the transmitting time.

In summary, the user can obtain the safety conditions that are necessary for constructing a safety network system merely by carrying out processes that are simple and easy to visually ascertain such as positioning and connecting devices to be used while watching the display screen (or just by selecting them).

In the above, display data are visually ascertainable by the user as devices to be connected and may comprise marks. Instinctively recognizable marks are preferred but characters such as "sensor 1" and "motor" may be used. Combinations such as a square including characters may be used as marks.

The invention also relates to a program product (a computer readable medium) which is for such a safety condition setting support device as characterized above and may be characterized as comprising program parts carrying out the steps of obtaining at least either of transmission interval between the connected safety devices and safety distance between the input device and the controlled apparatus, obtaining connection data showing connection relationship between the safety devices, reading out and thereby obtaining internal processing times of the safety devices from an apparatus data memory that stores data related to the internal processing times, and carrying out a calculation process based on the data obtained by the steps described above and thereby obtaining the safety conditions. Such a program product may be provided by being stored in a recording medium of various types to be installed in a computer through such a medium or may be distributed by making use of a communication network of different kinds.

The invention relates still further to a method of controlling a support device for obtaining safety conditions for a safety network as described above such that safety conditions will be set for stopping the controlled apparatus within a specified time period, the method being characterized as comprising the steps of preliminarily storing in the support device apparatus data related to internal processing times of safety devices connected to the safety network including the input device and the output device, causing the support device to obtain connection data showing connection relationship between the safety devices and at least either of transmission interval between the connected safety devices and safety distance between the input device and the controlled apparatus, and causing the support device to obtain the safety conditions based on the connection data and either of transmission interval and the safety distance obtained by the support device and the preliminarily stored apparatus data.

BRIEF DESCRIPTION OF DRAWINGS

FIG. 3 is a block diagram of an example of tool embodying this invention.

FIG. 4 shows an example of component database.

FIG. 5 shows an example of display screen on the display part.

FIG. 13 is an example of table for connection data.

FIG. 14 shows another form of safety network.

FIGS. 18 and 19 are examples of display on the display part related to the processing of FIG. 17.

FIGS. 20A, 20B and 20C, together referred to as FIG. 20, show an example of calculation process based on the network shown in FIG. 14.

FIGS. 21A, 21B and 21C, together referred to as FIG. 21 and

FIGS. 22A, 22B and 22C, together referred to as FIG. 22, show other examples of calculation process based on the network shown in FIG. 14.

FIG. 23 shows still another form of safety network.

FIGS. 24A, 24B and 24C, together referred to as FIG. 24 and

FIGS. 25A, 25B and 25C, together referred to as FIG. 25, show examples of calculation process based on the network shown in FIG. 23.

FIG. 26 shows still another form of safety network.

FIGS. 27A, 27B, 27C and 27D, together referred to as FIG. 27, and

DETAILED DESCRIPTION OF THE INVENTION

The invention is described with reference to the drawings.

Figure 2:
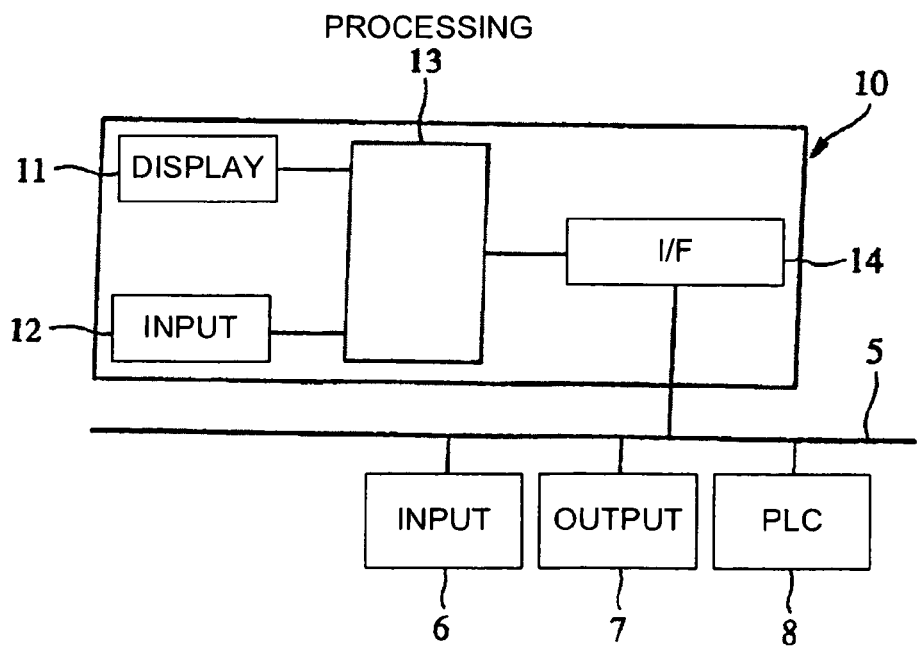
FIG. 2 is a block diagram of a network system embodying this invention.

FIG. 2 shows an embodiment of the invention. As shown, a safety network system is structured by connecting various devices corresponding to a safety network such as an input device 6, an output device 7 and a PLC 8 to a network 5 such that data can be exchanged between specified devices.

In order to form such a safety network system in an actually operable condition, it is necessary to download programs of various kinds. In order to carry out data communications between the PLC 8 and a slave (the input and output devices 6 and 7), furthermore, it is necessary to assign the I/O of the slave to the memory of the PLC 8. This is the same also for communications between the slaves. A tool 10 is adapted to be used for creating such programs and also to be connected to the network 5 for downloading programs to a specified device or to carry out memory assignments.

Next, the network system which is finally structured according to this invention is simply explained. Sensing data detected by the input device 6, for example, are transmitted to a specified PLC 8 through the network 5. The PLC 8 analyzes the received sensing data and transmits a control command to the output device 7 which is to be operated according to this sensing result. In the case of the occurrence of an abnormal situation, the output device 7 is caused to operate in a safe manner. There are also situations where a command is directly transmitted from the input device 6 to the output device 7.

In order to construct such a network system, it is necessary not only to physically connect each of these devices to the network but also to assign the module number of each I/O of each device to the memory (address) of the PLC and to carry out programming processes to form programs to determine what kind of calculation processes should be performed by the PLC. In order to construct a safety network, furthermore, it is necessary to carry out not only these communications but also various setting operations for realizing various safety functions. Explained in connection with the present invention, it is necessary to set the internal processing times and safety distances of various devices such that the safety operations will function, the system will be set on a safe side and the actions will be stopped when the network system is in a danger condition such that an emergency stop button has been pressed or the entry of a person is detected by a sensor such as a light curtain, but this must be done within a specified length of time (such as before the intruding person reaches the danger area). Such processing is carried out by using the tool 10. In the above, the safety distance means the distance between the input device and the controlled apparatus, that is, the distance between the detection position by the input device and the danger area. The processes carried out by the tool 10 are as follows.

The tool 10 is provided with a display part 11 such as a monitor, an input part 12 such as a keyboard, a mouse and other pointing devices, a processing part 13 for carrying out a specified signal processing based on data given from the input part 12 and a communication interface part 14 for connecting to the network 5. The processing part 13 is further adapted to cause the display part 11 to display the results of processing carried out according to data obtained through the input part 12, and is formed as shown in FIG. 3 more in detail.

As shown in FIG. 3, the processing part 13 comprises a display interface 13a for connecting to the display part 11 to control data transmission and reception, an input interface 13b for connecting to the input part 12 to control data transmission and reception and an MPU that actually carries out the data processing and serves to create data for constructing a network while using a memory 13e serving as a work area to follow the commands provided through the input part 12 and accessing a component database 13d and to download them through the communication interface 14 to the input device 6, the output device 7 and the PLC 8 such that a system is constructed.

The component database 13d stores data on components that can be connected directly or indirectly to the network of each apparatus. Data on function blocks FB with calculation function are also stored. The function blocks define only inputs and outputs as well as input-output relationships. In the above, the input-output relationship means definition of an input and an output by treating the detailed processing in between as a black box such as "to do an AND operation" such that the output will become 1 when all inputs are 1 or "distribution function where a single output (inclusive of situations where there is only one input and situations where there are a plurality of inputs on which a specified calculation is to be performed) is given to a plurality of receivers such that there is no one-to-one correspondence". The function of a PLC may be expressed by one or more function blocks.

As shown in FIG. 4, the component database 13d serves to record the names of components (inclusive of function blocks), marks that are the display data to be displayed on the display screen of the display part 11 and the data related to these components. The data related to the components include those for identifying the components as well as those for showing their characteristics and functions (such as input-output relationship in the case of a function block). They also include the relationship between the number of a terminal and its data direction (input or output) and the kind of data size. Data related to internal processing times of various apparatus may also be included. These examples are not intended to limit the scope of the invention.

The MPU 13c serves to access this component database 13d and to follow a specified standard to output and display a mark M indicative of the component in a component display area 11a of the display part 11 as shown in FIG. 5. For the sake of convenience, FIG. 5 shows an example wherein various kinds of components are displayed in a random order, but the kinds of components may be identified by the text input or by using a pointing device such that devices of a specified kind will be displayed. It goes without saying that any selected kind of components can be displayed. It is only required that a mark M indicative of a component be displayed on the display screen.

The user may use a pointing device to move the pointer P onto the selected mark on the display screen and select it by clicking on it such that the selected mark is set at a selected position in the work area 11b of the display part 11. This can be easily performed by dragging a mouse. This may also be carried out by clicking once on a mark to select it and clicking again at the selected position. Any other setting method may be utilized for the purpose.

The functions of the processing part 13 (or principally the MPU 13c) are explained next by referencing the flowchart of FIGS. 6 and 7. After power is switched on (Step ST1) for the tool 10, a required component is called (Step ST2) and placed at a specified position (Step ST3). In other words, the MPU 13c follows the instruction from the input part 12 to display specified marks stored in the component database 13d in the component display area 11a and to display selected ones of the displayed marks at specified positions in the work area 11b.

Figure 8:
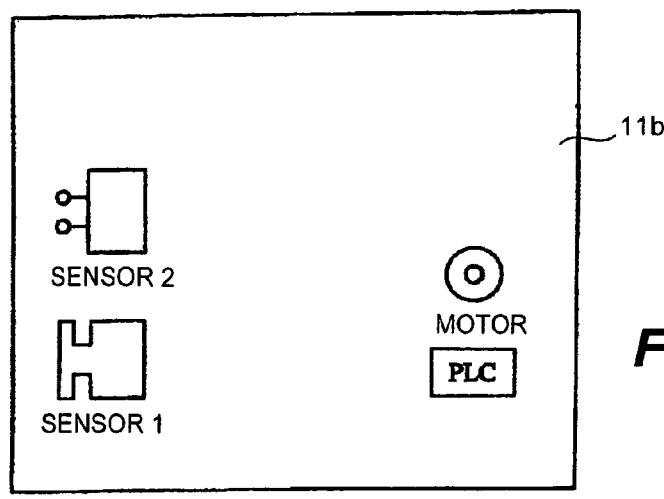
FIGS. 8-12 are examples of display on the display part.

After Steps ST2 and ST3 are carried out for all of the components for comprising the network to be created (YES in Step ST4), the work area 11b displays the selected components at their specified positions, as shown in FIG. 8.

Figure 9:
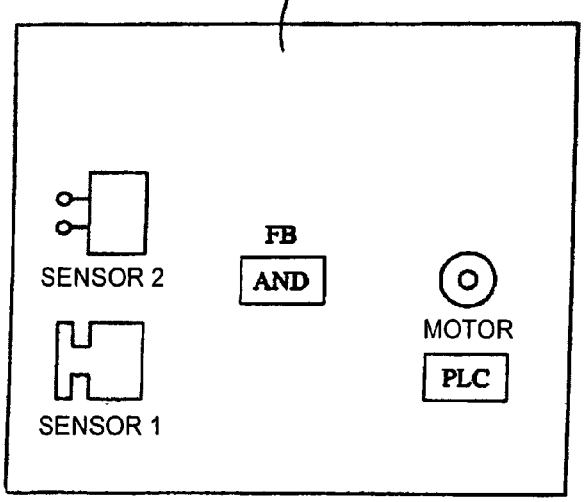

Next, it is determined whether function blocks are necessary or not (Step ST5). If they are necessary (YES in Step ST5), desired function blocks are called (selected) (Step ST6) and placed (Step ST7) at desired positions in the work area 11b. After Steps ST6 and ST7 are carried out for all of the desired function blocks, the work area 11b is displayed as shown in FIG. 9 with the selected function blocks placed at the desired positions.

From the point of view of the user operation and the processing by the MPU, the object of display (processing) changes from a component to a function block but they are essentially the same in that marks stored in the component database are displayed, selected and positioned. Although Steps ST2-ST4 and Steps ST5-ST8 are separately shown in FIG. 6 for the sake of convenience of explanation, they need not be carried out sequentially and their steps may be mixed together, or the function blocks may be processed first.

Next, a pointing device or the like is operated to select specified two of the marks displayed in the work area 11b by clicking on them (Step ST9). These selected marks correspond to two elements (components or function blocks) which directly carry out a data transfer. If there are a plurality of inputs or outputs, their numbers (addresses) are also specified.

Figure 10:
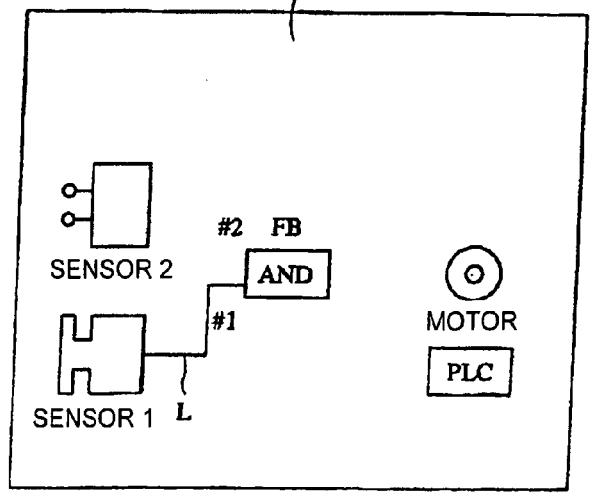

When this selection has been made, the MPU 13c connects the input and output of the selected two elements (Step ST10), that is, the selected two elements are connected by a line L as shown in FIG. 10 and this connecting line L is displayed. A technology used by a CAD system or the like may be used for the connection of the selected two points by a line L. In other words, the line L may be displayed as the connecting line of CAD. By thus displaying the line L as a connecting line of CAD, the connection between apparatus can be made visually clear.

Figure 12:
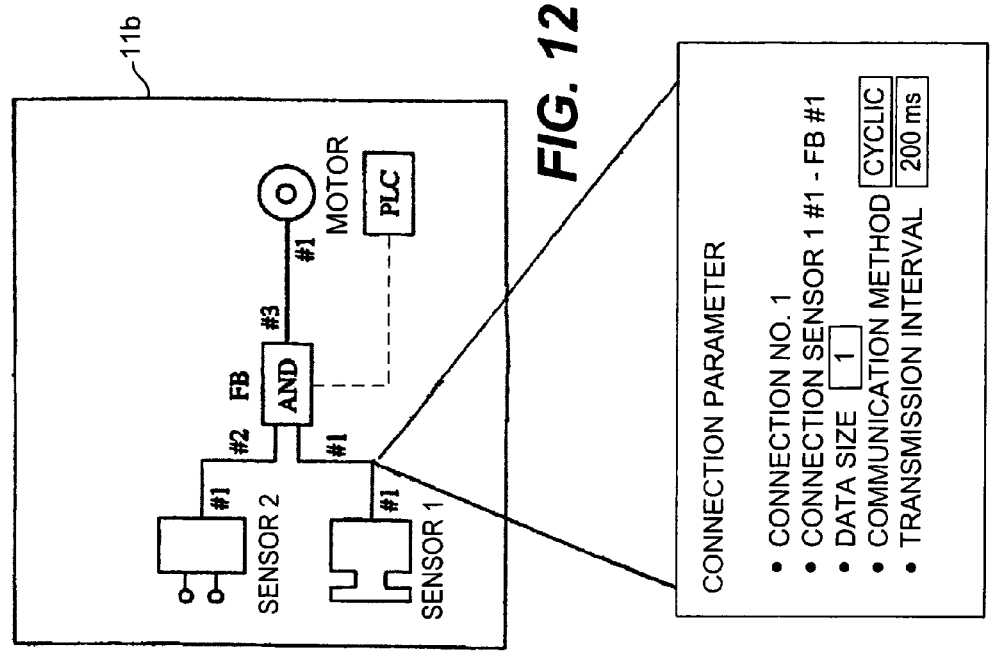
Figure 11:
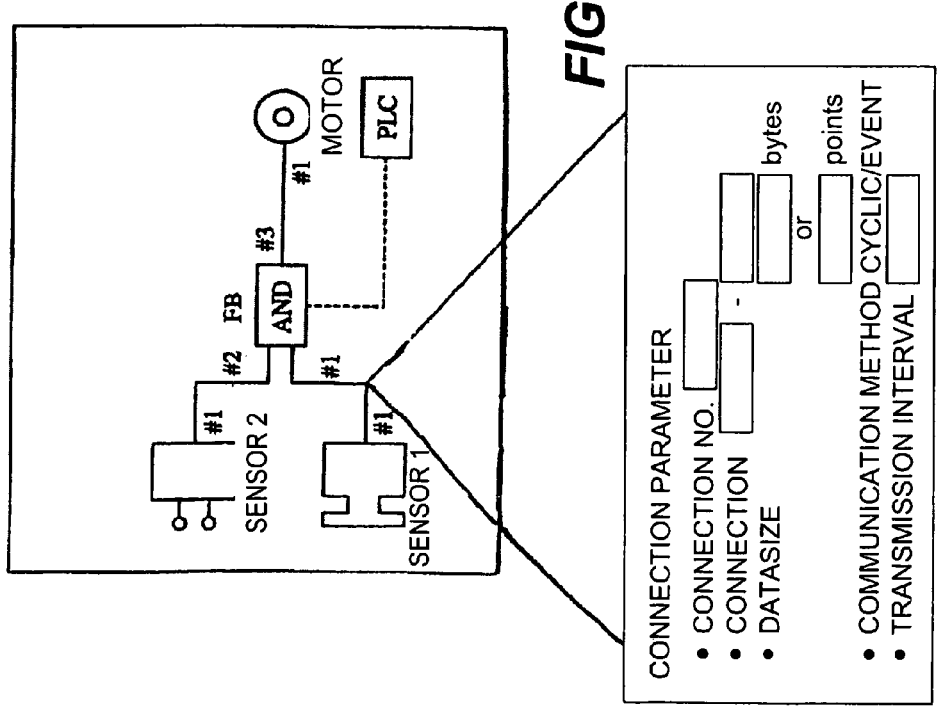

Next, as this displayed line L is selected (Step ST11), the input screen of communication parameter related to this line is displayed as shown in FIG. 12, allowing the user to input necessary parameters by using the input part 12 (Step ST12). The MPU 13c carries out Steps ST11 and ST12 by recognizing the two elements connected by the selected line L and identifying from where to where data flow.

This identification can be made easily, for example, by accessing each element of the component database 13d and obtaining the data direction of each terminal from the corresponding data. Data on the connection numbers and the addresser and addressee of data are created and displayed as shown in FIG. 12 at a corresponding position. In the above, the connection numbers may be determined in any manner as long as there is no duplication. For example, they may be assigned in an ascending order in which the connection lines were selected in Step ST11.

Next, the input part 12 such as a keyboard (with numerical keys) is used to input the data size and a transmission interval and to select "cyclic" or "event" as the communication method. The results of this input and the automatically set data described above are together displayed as shown in FIG. 12 such that the user can recognize its content. According to the present example, furthermore, the aforementioned communication parameters are registered in correlation with the line itself These prepared data are stored in the memory 13e.

By repeating such input processing for the connecting lines and communication parameters, data for all elements for constructing a network are inputted (Step ST13).

As explained above, connections of the apparatus can be visually grasped because the line L is displayed as a connecting line of CAD and communication parameters can be registered as line property data. Thus, reading and changing of network setting values at each connection can be easily managed by merely clicking on a connecting line.

It also goes without saying that Steps ST9 and ST10 for connecting lines and Steps ST11 and ST12 for setting communication parameters need not be done continuously. For example, the line connecting steps may be completed first and the parameter setting steps may be carried out thereafter or processing of both kinds may be done in a random order. They may be carried out also in any convenient order, inclusive of the aforementioned distribution of the components and function blocks.

When all connecting lines and communication parameters have been inputted (YES in Step ST13), the connection conditions of the components and function blocks and communication parameter data that have been created are read out as an execution command (for the creation of data for system construction) is received (Step ST14), and connection data and function block assignment data are created (Step ST15).

In the above, the connection data means a table (managed by the connection numbers) correlating the sender, receiver and the size of the transmitted data when data transmission is carried out between components or function blocks. FIG. 13 shows an example of such a table. Connection data can be set in reality based on communication parameters.

Function blocks are actually realized by calculation execution blocks (such as PLC) connected to the network and function block data serve to carry out their assignment. Connections to function blocks are actually formed as connections to the memory of the PLC. The example of FIG. 13 shows that Function Block #1 is actually assigned to #1 of PLC1, as indicated parenthetically. In other words, such descriptions inside parentheses are function block assignment data and they can be created by preliminarily correlating function blocks with PLCs.

After all data are thus created, they are downloaded to each apparatus (Step ST16). As shown in FIG. 2, the tool 10 is capable of data communications with each apparatus through the network 5. Of the data created in Step ST15, those to be downloaded to an apparatus that corresponds either to a sender or a receiver are extracted to create a connection data table and it is downloaded through the network. At this time, function blocks register data that are replaced by real apparatus (such as PLCs) according to the function block assignment data.

Thus, each apparatus receives the connection data for actually transmitting and receiving data and becomes capable of carrying out data communications. A network system is created and a network programming is carried out. After such programming is carried out, the tool 10 may be removed from the network 5 or may be left connected and used as a host for reconstructing devices for monitoring and management or a maintenance network.

Each of the apparatus that form the network has connection data. Thus, when it transmits or receives data, it can make reference to its connection data and directly transmit only the data to be transmitted to the intended receiver directly. In other words, direct communications between slaves are now possible while in a conventional system data could be transmitted between slaves only through a controller such as a PLC. When data are transmitted from an apparatus to a PLC, all data held by it were conventionally transmitted together but it is now possible to transmit selectively only the data that are necessary to the receiving PLC.

Figure 1:
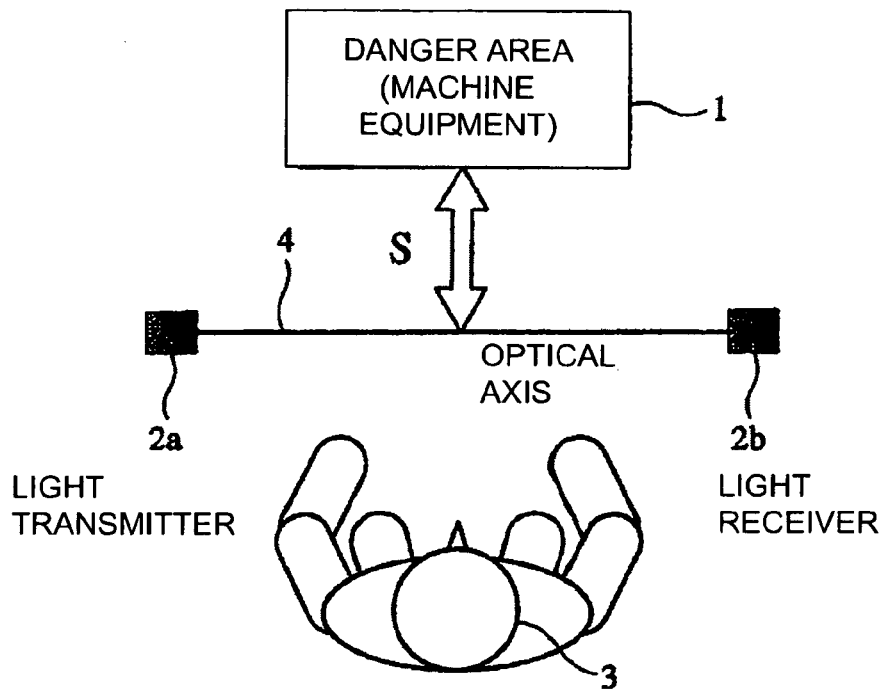
FIG. 1 is a drawing for explaining a safety network system.

As the tool 10 is operated, a condition can be set such that the apparatus that form the network can communicate among themselves. For constructing a safety network for detecting a person who is passing through and stopping the operation of a machine equipment as shown in FIG. 1, the system structure may be as shown in FIG. 14 with an input device A (corresponding to the light receiver 2b of FIG. 1) and an output device B (corresponding to a device for driving the machine equipment in the danger area 1 of FIG. 1) connected to the network 5 such that the detection output from the input device A is directly transmitted to the output device 7 through the network 5.

Figure 6:
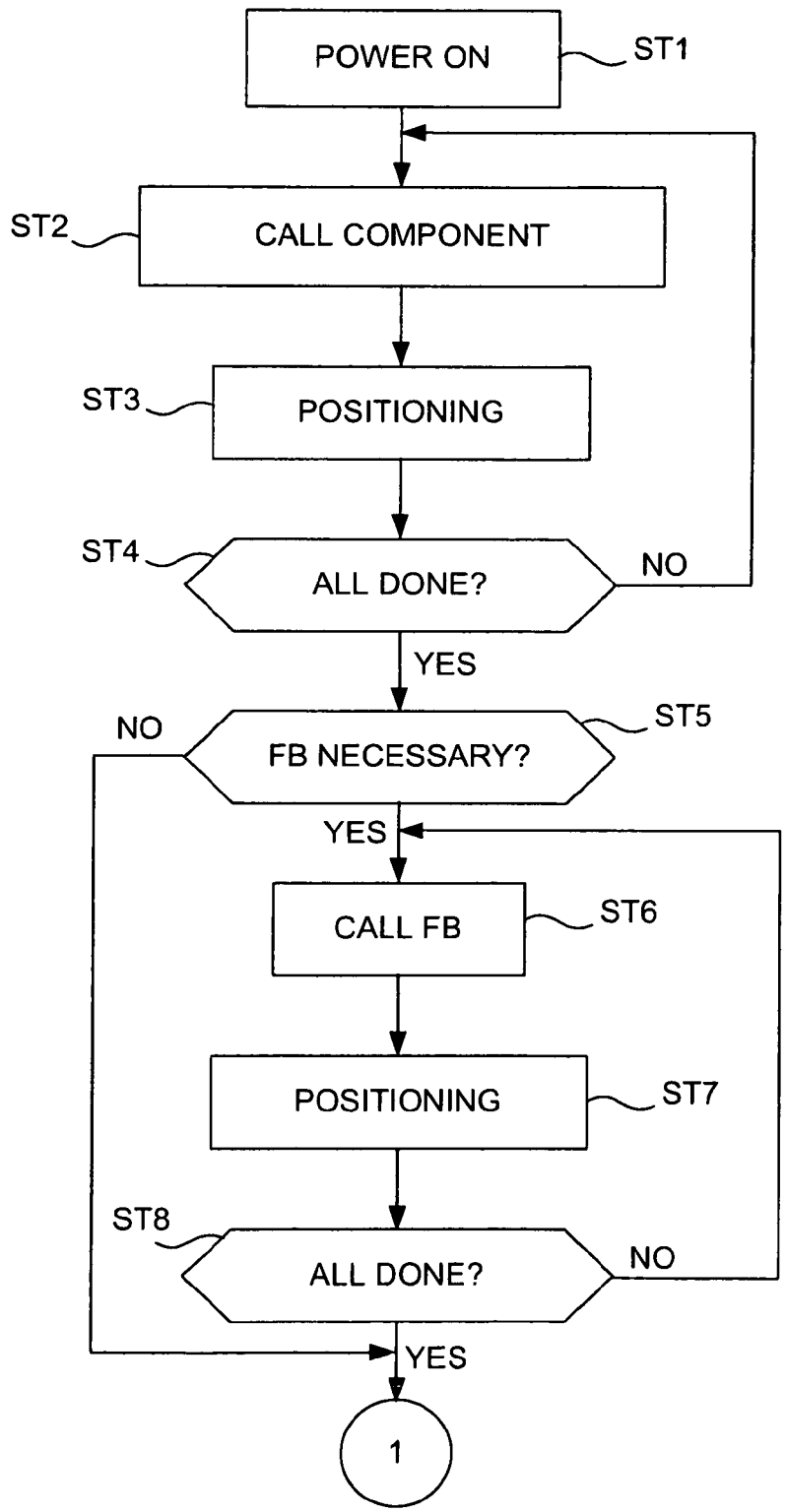
FIGS. 6 and 7 are a flowchart for mainly explaining the functions of the MPU.
Figure 15:
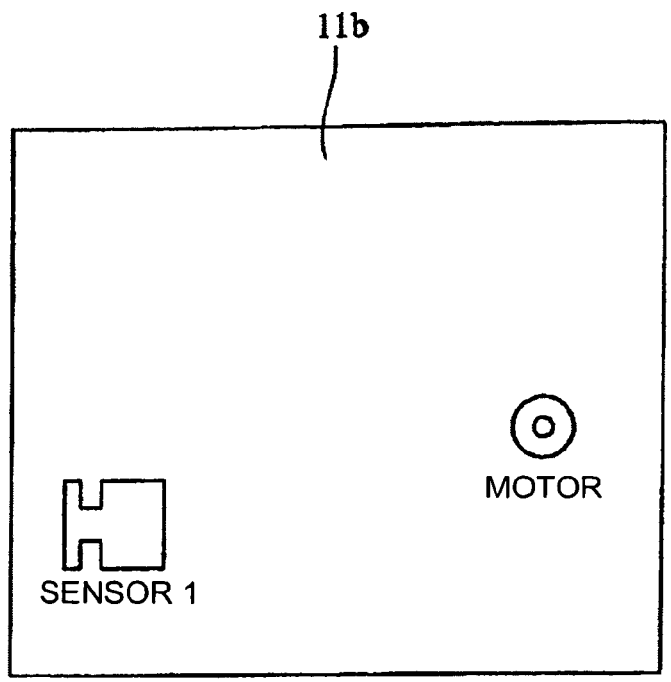
FIGS. 15 and 16 show displays on the display part.

If such a system structure is created by using the tool 10, the processes of the flowchart in FIG. 6 may be carried out to Step ST8 such that two components corresponding to a sensor (as the input device 6) and a motor (as the output device 7) are displayed at arbitrary positions in the work area 11b as shown in FIG. 15.

Figure 7:
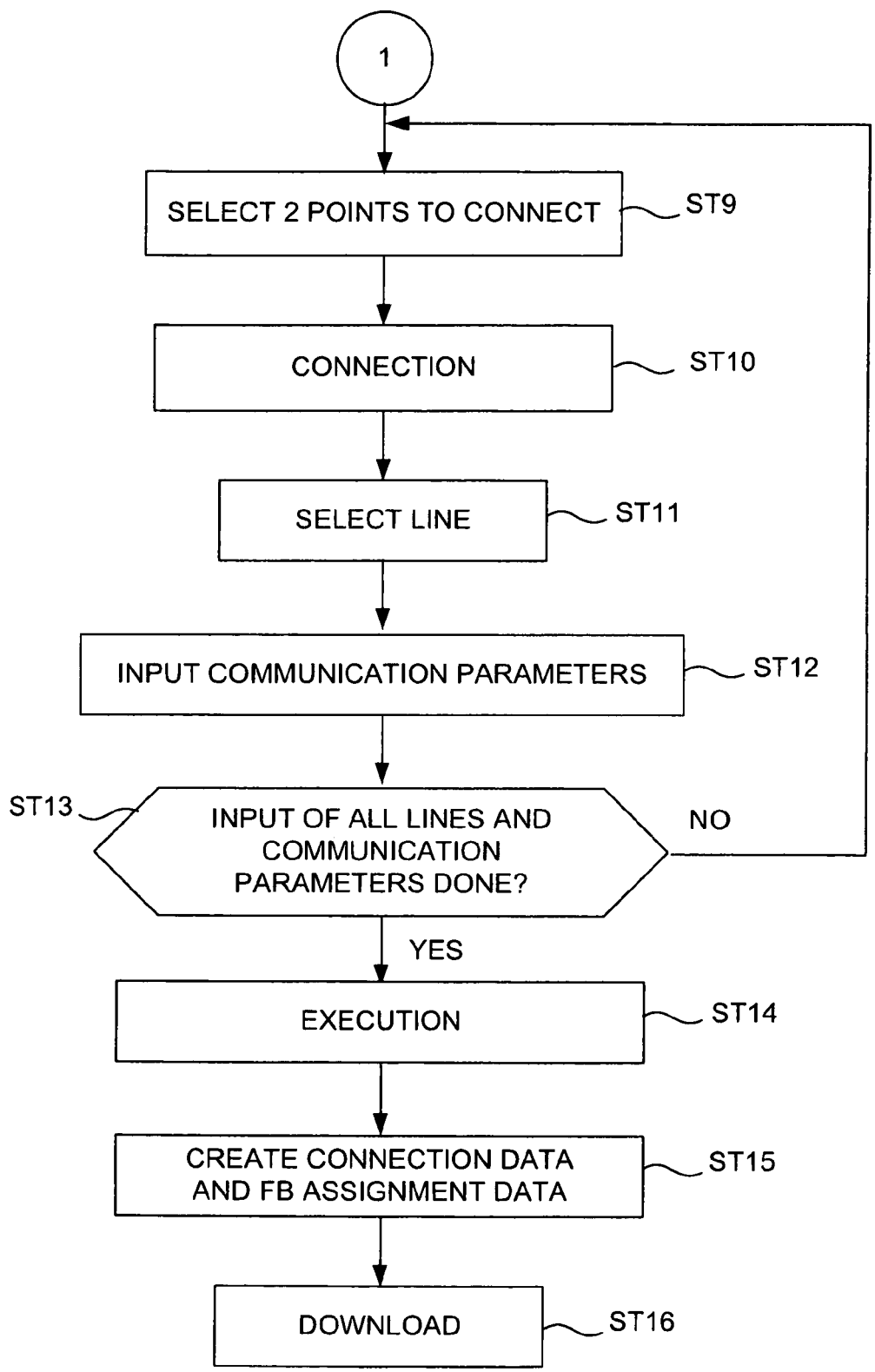
Figure 16:
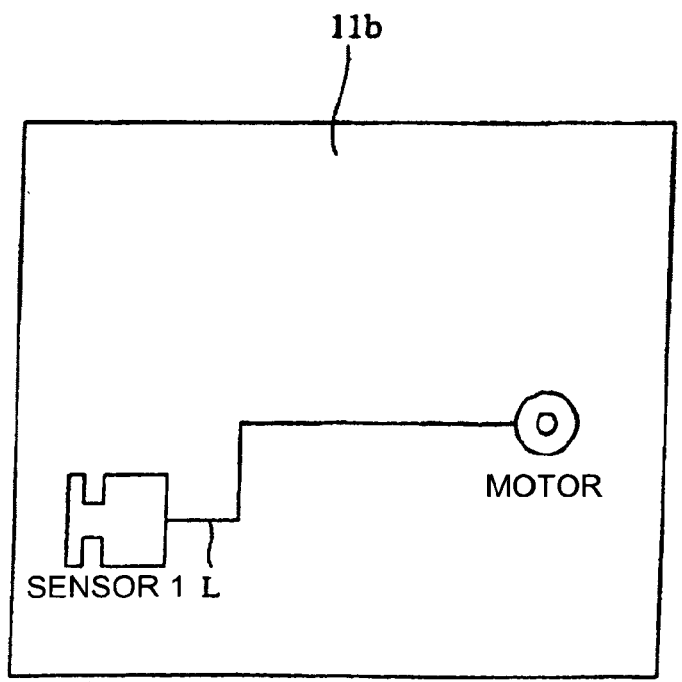

Next, as Step ST9 in the flowchart of FIG. 7 and the connection process of Step ST10 are carried out, the two marks on the work area 11b become connected by a line L as shown in FIG. 16. As this connection operation is effected, data including the connection number and data on sender-receiver relationship are created. As the processes subsequent to Step ST10 are carried out thereafter, communication data (communication conditions) such as communication method and transmission interval are set.

Aforementioned connection data and those related to placements, connections and communication parameters of actual components are stored in a specified memory device (such as the memory 13e). Changes can be made easily on the system thereafter by reading out such stored data and changing various conditions.

The tool 10 according to this invention may be used, for example, to read out of the memory various data related to a network system on which connection processes and the setting of various data have been completed and to set conditions for forming a safety network or to judge whether a set system is safe or not.

Figure 17:
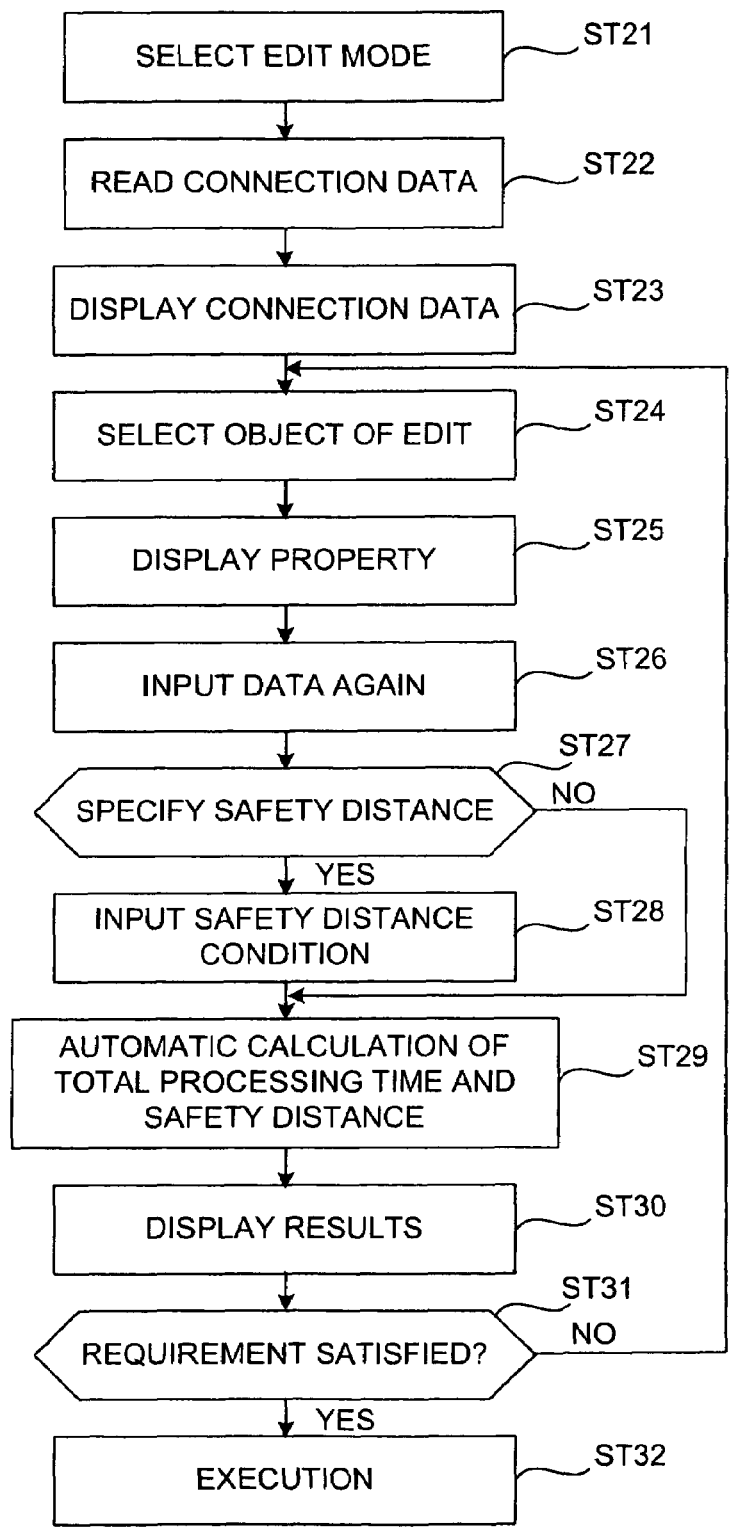
FIG. 17 is a flowchart of a processing according to this invention.

FIG. 17 shows a flowchart for such a process. As a command for an edit mode is received by the MPU 13c through the input part 12 (Step ST21), the connection data stored by the various means described above are read out (Step ST22) and the current connection data are visually displayed by the display part 11 (Step ST23). In other words, marks of individual elements are displayed at specified positions and lines connecting these marks are also displayed.

Next, objects to be edited such as apparatus to be exchanged are selected. If communication parameters are to be changed, a line may be selected (Step ST24). Properties such as communication parameters are displayed (Step ST25) and this makes it ready to input data. FIG. 18 shows an example of display that may be made in the work area 11b of the display part 11. The display is similar to that after the process of inputting communication parameters in Step ST12 (as shown in FIG. 12). In the present example, since data such as communication parameters are already inputted, communication method and transmission interval are also displayed as set data stored in a memory means. Although not displayed on the screen, internal processing time data related to the object apparatus are already read out from the component database 13d at this time.

The user operates the input part 12 and inputs data again if necessary (Step ST26) and determines whether a safety distance is to be specified or not after waiting for an input from the input part 12 (Step ST27). This may be done, for example, by providing an input switch area such as "Safety distance input" and "Condition calculation-judgment" on the display screen. If "Safety distance input" is selected, it is judged that an input of safety distance has been specified and a safety distance input screen is displayed and an input from the input part 12 is waited for. The safety distance to be inputted at this moment means the distance between the detection position by the actual input device and the danger area.

As a safety distance is inputted (Step ST28), a total of processing times and necessary safety distances are calculated (Step ST29) and the calculation results are displayed (Step ST30). If "Condition calculation-judgment" is selected (NO in Step ST27), the aforementioned calculations are carried out without the safety distance inputted.

In Step ST29, if both safety distance and transmission interval are given, it is determined whether or not these conditions satisfy the requirement of a safety network. If either of them has not been inputted, conditions that are necessary for satisfying the requirement of a safety network are obtained.

A determination is thereafter made regarding whether or not the requirement of a safety network is satisfied (Step ST31). This determination is made after an input is received from the user. It may be made automatically, based on the judgment made in Step ST28.

If it is found that the requirement has not been satisfied (NO in Step ST31), an object for which conditions are to be inputted again is selected (Step ST24) and the steps thereafter are repeated for reevaluation.

Figure 19:
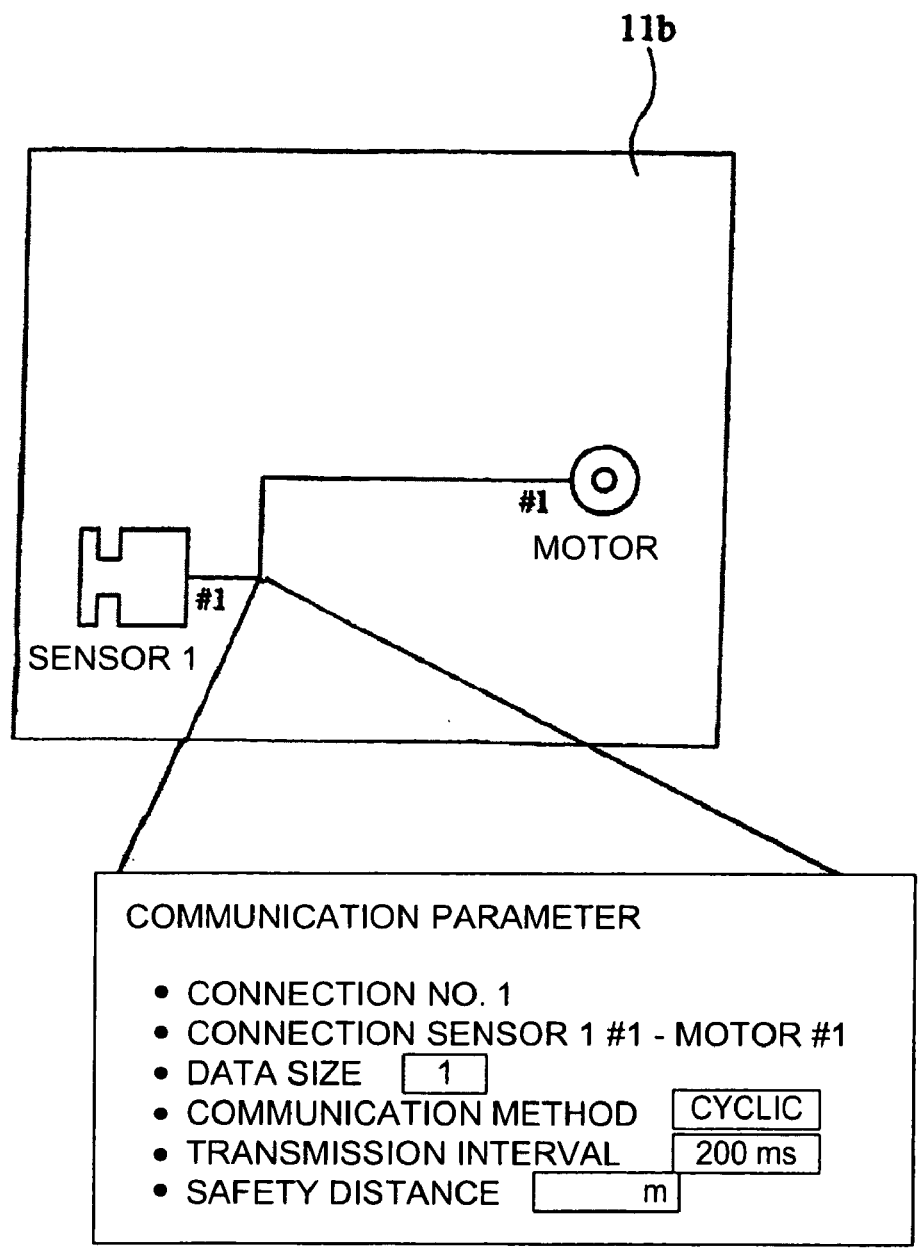

In the example described above, it was explained that a safety distance is inputted by displaying a safety distance input screen separately for making a specification but an area for inputting a safety distance may be displayed, as shown in FIG. 19, together with the display of property in Step ST25. If a specified button (for starting calculations, for example) is selected without any data inputted for safety distance, it is determined that the safety distance has yet to be inputted.

If it is judged that the requirement is satisfied (YES in Step ST31), corrected data on the connection conditions of components and function blocks and communication parameter data are read out, connection data and function block assignment data are created therefrom and they are downloaded to each apparatus (Step ST32) to complete the process. In the above, the downloading step may be omitted if only the safety distance alone is set or changed as a result of the flowchart of FIG. 17 while there has been no change in the transmission interval or connection conditions.

At the time of this downloading step, if it is known which of the apparatus has undergone any change, the connection data may be referenced and it may be so arranged that only the data related to such apparatus that are affected by the apparatus which has been changed will be updated. Data related to all apparatus may be summarily updated, instead.

Next, the calculation process to be carried out in Step ST29 is explained more in detail. Let us assume that the network structure is as shown in FIG. 14, for example, and the input parameters as shown in FIG. 20A are obtained by reading from connection data. Since the connection objects therein are A and B, internal processing times of components A and B are obtained as shown in FIG. 20B by reading from the component database 13*d*. In this example, it is assumed that there was no input of safety distance and that the walking speed of the worker has been preliminarily inputted as 1 m/sec although it goes without saying that this speed can be varied.

In the case of this network system, since a direct detection signal is transmitted from the input device 6(A) to the output device 7(B), the number (of times) of communications is once (from A to B) and the time required for this communication is 200 ms as read from a column of transmission interval request.

A total processing time is obtained by summing this communication time together with the internal processing times of A and B, that is, 200+300+500=1000. Thus, in the network system, the total processing time required at the time of occurrence of an abnormal condition is 1000 ms. Since the walking speed of the worker is assumed to be 1 m/sec, the necessary safety distance is found to be 1 m.

The safety distance thus calculated may be outputted as shown in FIG. 20C. From such an output display, the user can ascertain that the safety distance corresponding to the preliminarily set communication conditions is 1 m or longer and may judge whether or not this is a realistically adaptable distance. If it is judged that such a distance can be adapted, the judgment for Step ST31 becomes YES and the process is completed.

If it is determined that a distance of 1 m cannot realistically be secured at the actual site, conditions are altered and inputted again for repeating the calculations. The conditions may be changed such that the transmission interval is shortened. Instead, the maximum distance that can be secured may be inputted as the safety distance to calculate the transmission interval that can satisfy the requirement of a safety network. If the transmission interval is changed, since this change must be reflected in the actual network, Step ST33 is carried out again to download the changed conditions.

FIG. 21 comprising FIGS. 21A, 21B and 21C is an example wherein both a transmission interval and a safety distance are inputted to judge appropriateness of the setting condition. In this example, the safety distance is inputted as 2 m, the other conditions being the same as shown in FIG. 20. Thus, if the calculation process of Step ST29 is carried out under this condition, the total processing time and the safety distance are likewise obtained respectively as 1000 msec and 1 m or longer.

If a safety distance is already inputted, this is compared with the calculated safety distance to judge if the requirement for safety network system is satisfied or not. In the present example, since the necessary safety distance is 1 m or longer and the inputted safety distance is 2 m, the requirement is judged to be satisfied (or OK) and a display as shown in FIG. 21C is made in Step ST30.

FIG. 22 comprising FIGS. 22A, 22B and 22C is another example wherein both a transmission interval and a safety distance are inputted to judge appropriateness of the setting condition. In this example, the safety distance is inputted as 0.5 m, the other conditions being the same as shown in FIG. 20. Thus, if the calculation process of Step ST29 is carried out under this condition, the total processing time and the safety distance are likewise obtained respectively as 1000 msec and 1 m or longer. In this case, since the inputted safety distance is 0.5 m which is less than the calculated necessary safety distance, the judgment result becomes NG (no good) and a display as shown in FIG. 22C is made in Step ST30. In this case, the user considers whether the safety distance cannot be made longer at the site or whether the transmission interval cannot be made shorter, and inputs another condition to repeat the process until the judgment result becomes OK. If judgment result of NG continues to repeat, the user may consider inputting only one of the transmission interval and the safety distance to obtain the value of the other for satisfying the condition for the requirement, as explained above with reference to FIG. 20.

The network structure of FIG. 14 showing direct connection (for decentralized control by apparatus) is not intended to limit the scope of the invention. Instead, the network structure may be as shown FIG. 23 for a centralized control by a PLC. FIG. 23 shows an example wherein detection signals from an input device 6(A) are transmitted through a PLC 8(C) to an output device 7(B).

In this case, two input parameters are read out in the edit mode, as shown in FIG. 24A, for Connection #2 connecting from A to C and Connection #3 connecting from C to B. Accordingly, three apparatus data are read out of the component database 13d that are the internal processing times of apparatus A, B and C, as shown in FIG. 24B. As the calculation in Step ST20 is carried out based on these input parameters and apparatus data, a communication time of 400 msec is obtained as the sum of two transmission intervals and a total sum of 2200 msec is obtained by further adding thereto the three internal processing time of the three involved apparatus A, B and C. Since the walking speed of the worker is assumed to be 1 m/sec, a safety distance yet to be inputted is calculated to be 2.2 m or longer. This may be displayed as shown in FIG. 24C.

With the network structure as shown in FIG. 23, too, it is possible to judge whether an inputted safety distance and transmission interval satisfy the setting condition. FIG. 25A shows an example wherein a safety distance is inputted as 2 m, the other input parameters and the internal processing times of the three apparatus A, B and C being the same as in the example shown in FIG. 24.

If the calculation process of Step ST29 is carried out under this condition, the necessary safety distance is obtained as 2.2 m or longer and the result of judgment becomes NG, as shown in FIG. 25C.

FIG. 26 shows still another network structure for a mixed decentralized control, having a plurality of (two in this example) pairs of input device 6 and output device 7 (a pair of A and B and another pair of C and D).

Conditions for constructing a safety network can be set with such a network structure basically by carrying out a similar process as the decentralized control shown in FIG. 14. As shown in FIG. 27A, input parameters are read out for each pair, and the internal processing times of apparatus A-D are also read out from the component database 13d as shown in FIG. 27B. FIG. 27 is an example wherein a transmission interval is given and a safety distance is obtained therefrom. A calculation process based on Information parameter 1 and apparatus data A and B gives a total processing time as 1000 msec and safety distance as 1 m or longer, as shown in FIG. 27C. A calculation process based on Information parameter 2 and apparatus data C and D gives a total processing time as 1400 msec and safety distance as 1.4 m or longer, as shown in FIG. 27D.

Figure 28:
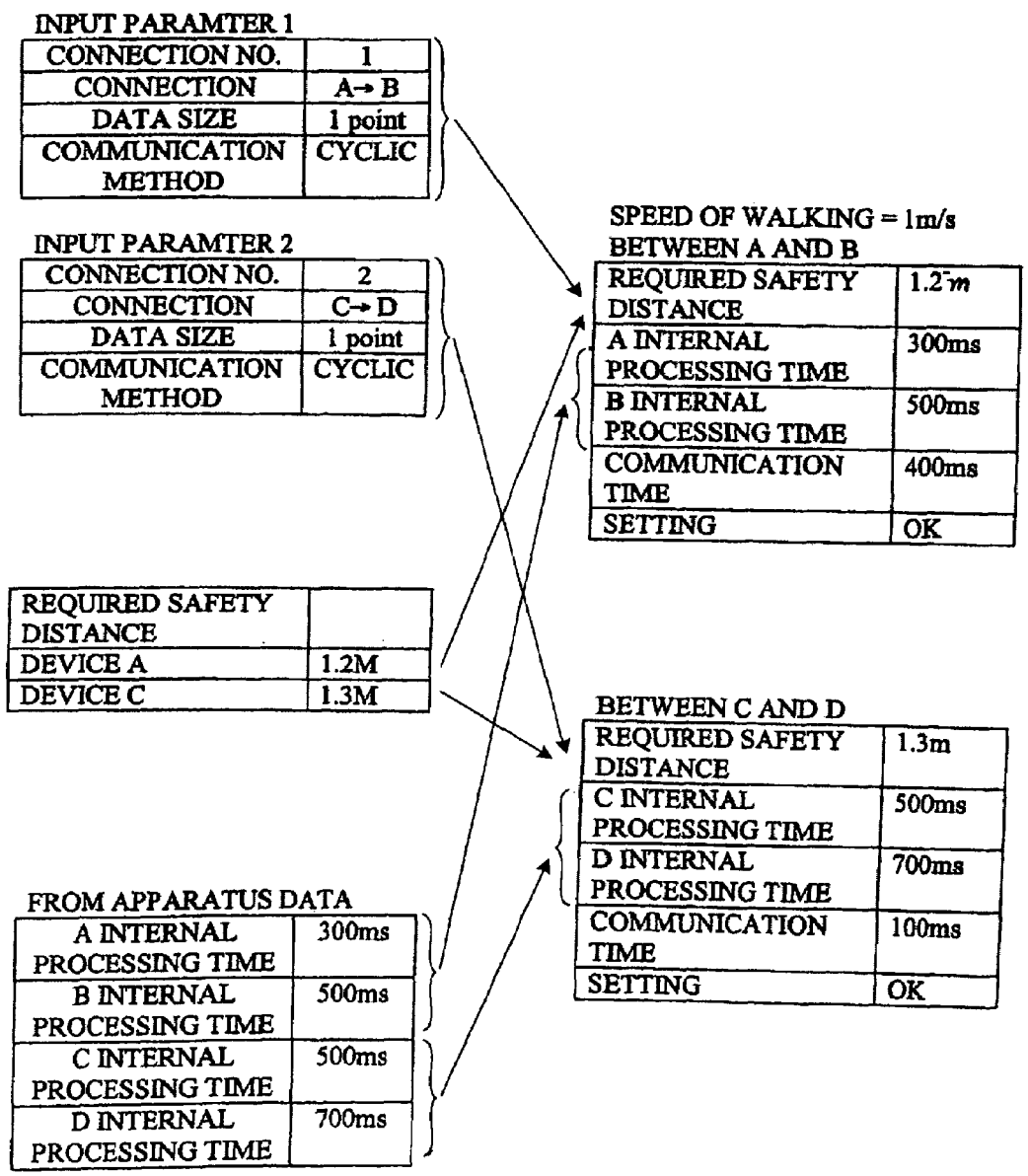
FIG. 28 show examples of calculation process based on the network shown in FIG. 26.

As shown in FIG. 28, a safety distance may be given to obtain therefrom an optimum transmission interval. Many kinds of long and short communication times satisfying the safety requirement can be obtained by calculation. In the case of a network, however, an upper limit and a lower limit are frequently determined and they are frequently set scattered between these limits.

If a communication time is calculated for a display but there is a fraction, the time which is larger in value and closest to the calculation result is set. If the calculated time is outside the limits, the judgment result becomes NG.

In all of the examples above, the transmission interval was considered to be constant but it may be appropriately varied. In the case of FIG. 27, for example, since the safety distance is 1 m between A and B, actual setting is possible even if the transmission time remains at 200 msec but a safety distance of only 1.2 m can be taken between C and D, the transmission interval between C and D may be shortened as an answer. If a good "traffic" cannot be obtained for the network as a whole by reducing only one of the transmission intervals, the actual distance to an apparatus that has an enough margin for the safety distance may be increased (say, by setting the safety distance of the input device to 2 m) such that the safety requirement can be satisfied although the transmission interval is long.

According to the example described above, connection data and data on positions and connections of actual components as well as communication parameters are created and stored once and the stored data are read out for setting various conditions for satisfying the requirement for a safety network but this is not intended to limit the scope of the invention. When communication parameters are inputted in Step ST12 of FIG. 7, for example, processes of Step ST26 and thereafter for inputting data for setting a safety condition may be carried out and the requirement for a safety network may be also set as well as the connection data. In this case, the setting may be erased at the time of the downloading.

The examples above have been described as being installed to the tool but these processes (for carrying out the various flowcharts) may be presented as programs to be carried out by a computer, and such programs may be presented in the form of various computer readable recording media.

Figure 29:
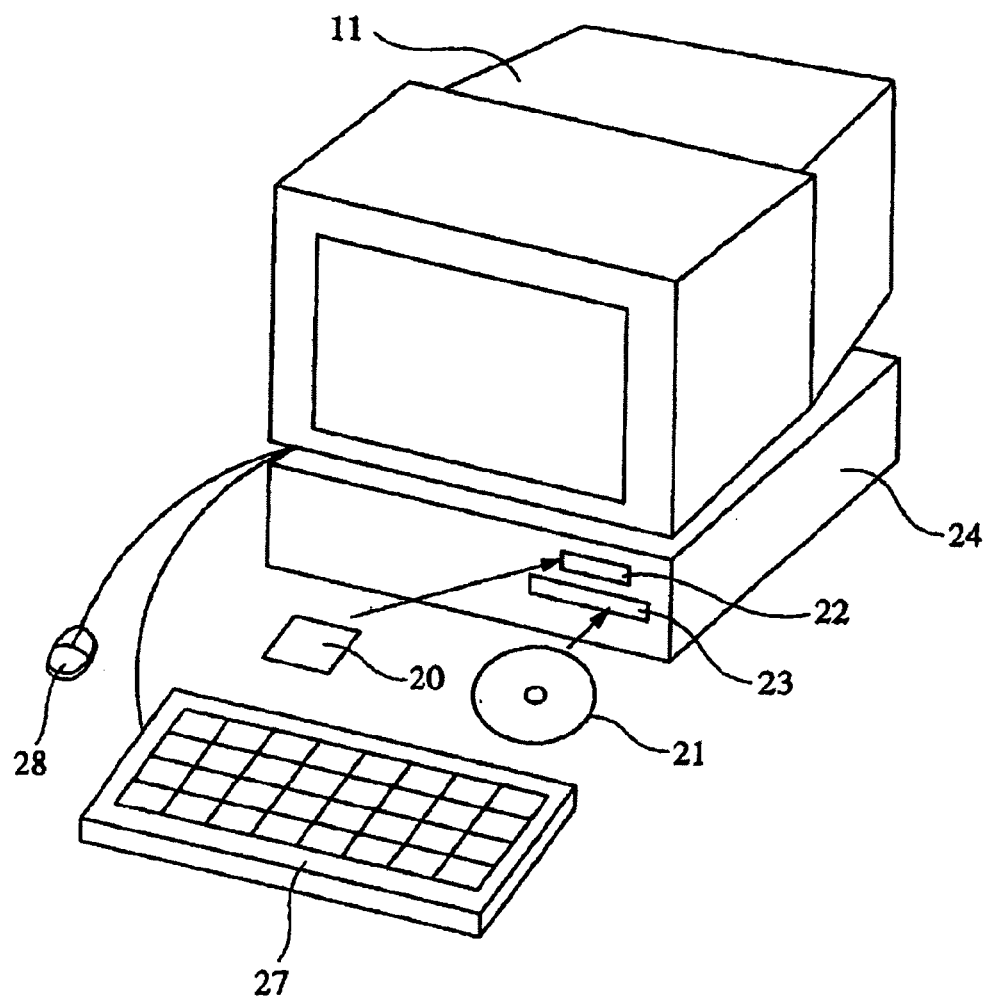
FIG. 29 is an external view of a system using recording media embodying this invention.
Figure 30:
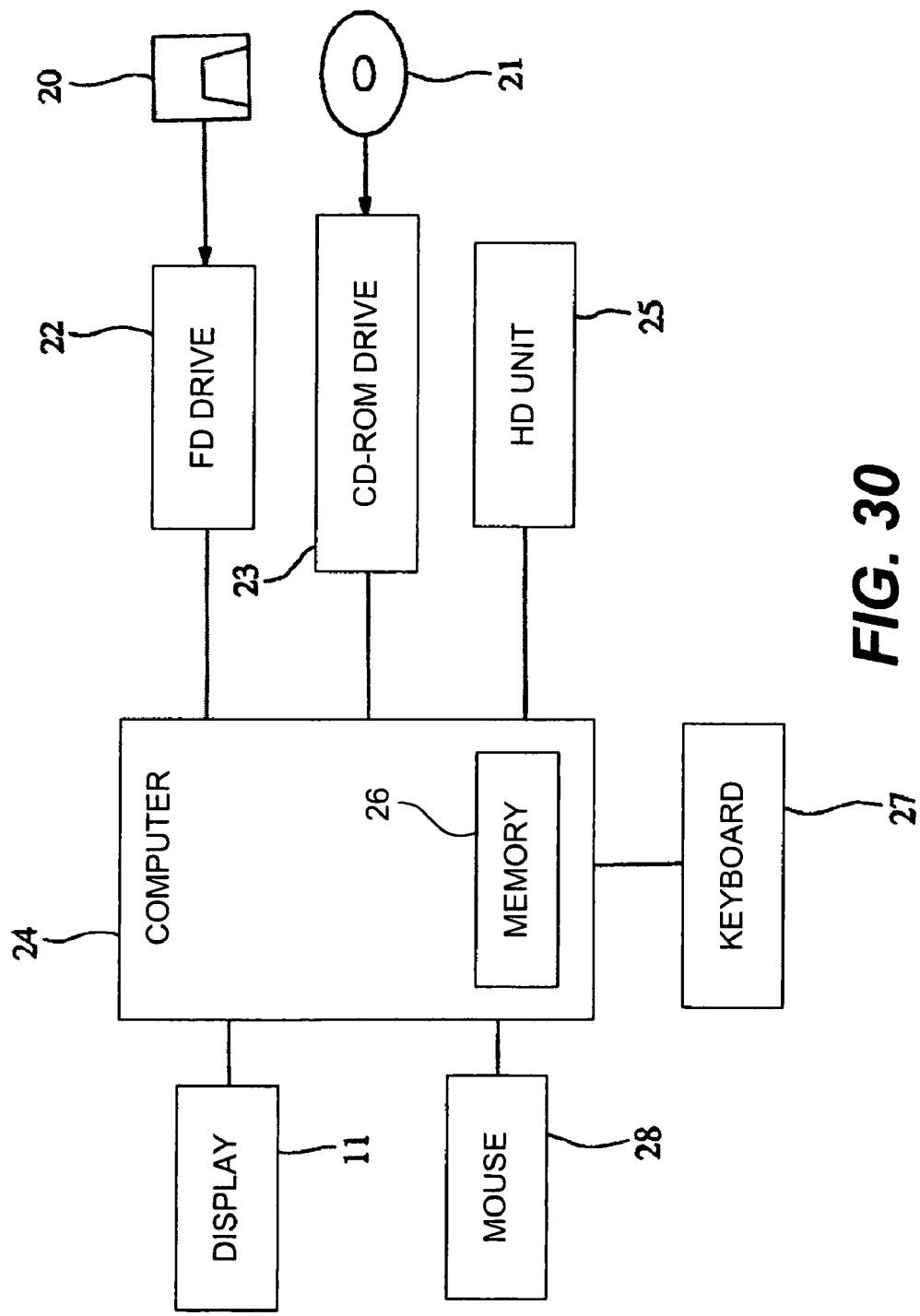
FIG. 30 is a block diagram of the system of FIG. 29.

As shown in FIGS. 29 and 30, examples of such recording medium include a flexible disk (FD) 20 and a CD-ROM 21. Programs stored on such a recording medium 20 or 21 are installed on an HD unit connected to (contained in) a computer 24 through a FD drive 22 or a CD-ROM drive 23 such that the computer 24 can function as the aforementioned tool.

As concrete examples, programs for carrying out the flowcharts shown in FIGS. 7, 8 and 17 are installed on the HD unit 25 and transferred from the HD unit 25 to an internal memory 26 every time they are to be used such that various processes can be carried out at a high speed. The aforementioned component database 13d may be realized by the HD unit 25.

When the programs are installed to a computer, a keyboard 27 and a mouse 28 form the input part 12 and a display serving as the display device 11 is used for displaying various data.

These programs need not be stored on a memory medium but may be themselves presented as computer readable program products. Then, the processing part 13 for carrying out the flowcharts described above will comprise an application program (as a program product), being installed in a computer serving as the tool 10 (as the safety condition setting device of this invention) and executed by its CPU.

Although the invention was described above by way of examples wherein connecting lines were used such that they can be visually and hence easily recognized, this is not intended to limit the scope of the invention. Text data may be used instead for the purpose of this invention. Since the essential point of this invention is to obtain safety conditions, it is not always necessary to set assignments of memories to be used.

In summary, the advantage of this invention is to make it possible to set various parameters (such as safety distances and transmission intervals related to various apparatus) for constructing a safety network because necessary internal processing times can be extracted from a memory device storing apparatus data although the specifications of the apparatus to be actually used in a system are not being understood.

What is claimed is:

1. A safety condition setting support device for a safety network, said safety network serving to cause an output device to stop a controlled apparatus, when an input device has detected a danger condition, based on a detection signal outputted from said input device, said safety condition setting support device serving to set safety conditions for stopping said controlled apparatus within a specified time period; said safety condition setting support device comprising:
   an apparatus data memory that stores data related to internal processing times of safety devices including said input device and said output device that are connected to said safety network;
   data obtaining means for obtaining connection data showing connection relationship among said safety devices and at least either of transmission intervals among said safety devices and a safety distance between said input device and said controlled apparatus; and
   calculating means for obtaining said safety conditions based on said connection data, said internal processing times and at least either of said transmission intervals among said safety devices and said safety distance.

2. The safety condition setting support device of claim 1 wherein said calculating means serves to obtain a value of one selected from the group consisting of said transmission intervals and said safety distance that has not been inputted.

3. The safety condition setting support device of claim 1 wherein said calculating means determines, when said safety distance and said transmission intervals have been inputted, whether said safety conditions are thereby satisfied.

4. The safety condition setting support device of claim 1 adapted to download to said safety devices said safety conditions that have been set.

5. The safety condition setting support device of claim 2 adapted to download to said safety devices said safety conditions that have been set.

6. The safety condition setting support device of claim 3 adapted to download to said safety devices said safety conditions that have been set.

7. The safety condition setting support device of claim 1 further comprising:
   a display part; and
   a display data memory that stores display data related to said safety devices;
   wherein said safety condition setting support device is adapted to display on said display part connecting lines which connect those of specified ones of said safety devices that are displayed inside a work area on said display part and specified through an input part by using said display data stored in said display data memory, and
   wherein said calculating means obtains said safety conditions by reading out the internal processing times of the safety devices connected by said connecting lines.

8. The safety condition setting support device of claim 2 further comprising:
   a display part; and
   a display data memory that stores display data related to said safety devices;
   wherein said safety condition setting support device is adapted to display on said display part connecting lines which connect those of specified ones of said safety devices that are displayed inside a work area on said display part and specified through an input part by using said display data stored in said display data memory, and
   wherein said calculating means obtains said safety conditions by reading out the internal processing times of the safety devices connected by said connecting lines.

9. The safety condition setting support device of claim 3 further comprising:
   a display part; and
   a display data memory that stores display data related to said safety devices;
   wherein said safety condition setting support device is adapted to display on said display part connecting lines which connect those of specified ones of said safety devices that are displayed inside a work area on said display part and specified through an input part by using said display data stored in said display data memory, and
   wherein said calculating means obtains said safety conditions by reading out the internal processing times of the safety devices connected by said connecting lines.

10. The safety condition setting support device of claim 4 further comprising:
    a display part; and
    a display data memory that stores display data related to said safety devices;
    wherein said safety condition setting support device is adapted to display on said display part connecting lines which connect those of specified ones of said safety devices that are displayed inside a work area on said display part and specified through an input part by using said display data stored in said display data memory, and
    wherein said calculating means obtains said safety conditions by reading out the internal processing times of the safety devices connected by said connecting lines.

11. The safety condition setting support device of claim 5 further comprising:
    a display part; and
    a display data memory that stores display data related to said safety devices;
    wherein said safety condition setting support device is adapted to display on said display part connecting lines which connect those of specified ones of said safety devices that are displayed inside a work area on said display part and specified through an input part by using said display data stored in said display data memory, and
    wherein said calculating means obtains said safety conditions by reading out the internal processing times of the safety devices connected by said connecting lines.

12. The safety condition setting support device of claim 6 further comprising:
    a display part; and
    a display data memory that stores display data related to said safety devices;
    wherein said safety condition setting support device is adapted to display on said display part connecting lines which connect those of specified ones of said safety devices that are displayed inside a work area on said display part and specified through an input part by using said display data stored in said display data memory, and
    wherein said calculating means obtains said safety conditions by reading out the internal processing times of the safety devices connected by said connecting lines.

13. A computer readable program product stored on a computer readable medium when executed by a processor for a safety condition setting support device for a safety network, said safety network connecting to safety devices including an output device and an input device and serving to cause said output device to stop a controlled apparatus, when said input device has detected a danger condition, based on a detection signal outputted from said input device, said safety condition setting support device serving to set safety conditions for stopping said controlled apparatus within a specified time period, said program product comprising program parts carrying out the steps of:

obtaining at least either of transmission interval between said connected safety devices and safety distance between said input device and said controlled apparatus;

obtaining connection data showing connection relationship between said safety devices;

reading out and thereby obtaining internal processing times of said safety devices from an apparatus data memory that stores data related to said internal processing times; and carrying out a calculation process based on the data obtained by the aforementioned steps and thereby obtaining said safety conditions.

14. A method of controlling a support device for a safety network, said safety network serving to cause an output device to stop a controlled apparatus, when an input device has detected a danger condition, based on a detection signal outputted from said input device, said support device serving to set safety conditions for stopping said controlled apparatus within a specified time period, said method comprising the steps of:

preliminarily storing in said support device apparatus data related to internal processing times of safety devices connected to said safety network including said input device and said output device;

causing said support device to obtain connection data showing connection relationship between said safety devices and at least either of transmission interval between said connected safety devices and safety distance between said input device and said controlled apparatus; and causing said support device to obtain said safety conditions based on said connection data and said either of transmission interval and said safety distance obtained by said support device and said preliminarily stored apparatus data.

15. A safety condition setting support device for setting safety condition for a safety network of a safety system, said safety system serving to cause a controlled apparatus to stop by a failsafe function when a safety condition cannot be maintained, said safety network communicating based on set communication parameters, said safety network being connected to a danger signal outputting device for outputting a danger signal indicative of a danger condition of said safety system, said safety network being connected to apparatus including an input device for outputting a detection signal to said safety network when said danger signal is received from said danger signal outputting device, and an output device for stopping said controlled apparatus on the condition that a signal received through said safety network indicates that said detection signal has been outputted from said input device; said safety condition setting support device comprising:

input means for setting said communication parameters;

an apparatus data memory that stores data related to internal processing times of said input device and said output device;

data obtaining means for obtaining data related to communication time required for network communication from said input device to said output device based on said communication parameters set by said input means; and calculating means for calculating a total processing time at the time of occurrence of abnormality from said data related to internal processing times and said data related to communication time and obtaining a value that satisfies a safety condition related to the distance from detection position by said input device to a danger area associated with said controlled apparatus based on said total processing time and an estimated walking speed of a person.

16. A safety condition setting support device for setting safety condition for a safety network of a safety system, said safety system serving to cause a controlled apparatus to stop by a failsafe function when a safety condition cannot be maintained, said safety network communicating based on set communication parameters, said safety network being connected to a danger signal outputting device for outputting a danger signal indicative of a danger condition of said safety system, said safety network being connected to apparatus including an input device for outputting a detection signal to said safety network when said danger signal is received from said danger signal outputting device, and an output device for stopping said controlled apparatus on the condition that a signal received through said safety network indicates that said detection signal has been outputted from said input device; said safety condition setting support device comprising:

an apparatus data memory that stores data related to internal processing times of said input device and said output device;

input means for inputting safe distance data related to distance from detection position by said input device to a danger area associated with said controlled apparatus;

data obtaining means for obtaining said safe distance data inputted by said input means; and calculating means for obtaining a value related to said communication parameters that satisfies a safety condition related to communication time required for network communication from said input device to said output device based on said data related to internal processing times and said safe distance data.

17. A safety condition setting support device for setting safety condition for a safety network of a safety system, said safety system serving to cause a controlled apparatus to stop by a failsafe function when a safety condition cannot be maintained, said safety network communicating based on set communication parameters, said safety network being connected to a danger signal outputting device for outputting a danger signal indicative of a danger condition of said safety system, said safety network being connected to apparatus including an input device for outputting a detection signal to said safety network when said danger signal is received from said danger signal outputting device, and an output device for stopping said controlled apparatus on the condition that a signal received through said safety network indicates that said detection signal has been outputted from said input device; said safety condition setting support device comprising:

input means for setting said communication parameters and inputting safe distance data related to a safe distance from detection position by said input device to a danger area associated with said controlled apparatus;

an apparatus data memory that stores data related to internal processing times of said input device and said output device;

data obtaining means for obtaining data related to communication time required for network communication from said input device to said output device based on said communication parameters set by said input means and obtaining said safe distance data inputted by said input means; and calculating means for calculating a total processing time at the time of occurrence of abnormality from said data related to internal processing times and said data related to communication time, comparing a product value obtained by multiplying data related to said total processing time and data related estimated walking speed of a person with said safety distance data, and judging OK if said safety distance is greater and no good if said safety distance is shorter.

18. The safety condition setting support device of claim 15 wherein said safety network of said safety system is connected to said input device, said output device and a programmable controller having duplexed operating parts, said input device serving to transmit said danger signal outputted to said safety network to said output device through said programmable controller through said safety network;

wherein said input means serves to set communication parameters from said input device to said programmable controller and communication parameters from said programmable controller to said output device;

wherein said apparatus data memory serves to store data related to internal processing time of said programmable controller;

wherein said data obtaining means serves to obtain, based on said communication parameters set by said input means, data related to first communication time required for network communication from said input device to said programmable controller and data related to second communication time required for network communication from said programmable control to said output device; and wherein said calculating means serves to obtain said communication times based on the data related to said first communication time and the data related to said second communication time and to obtain said total processing time based on the data related to said internal processing time of said programmable controller, the data related to the internal processing time of said input device, the data related to the internal processing time of said output device, the data on said first communication time and the data on said second communication time.

19. The safety condition setting support device of claim 16 wherein said safety network of said safety system is connected to said input device, said output device and a programmable controller having duplexed operating parts, said input device serving to transmit said danger signal outputted to said safety network to said output device through said programmable controller through said safety network;

wherein said input means serves to set communication parameters from said input device to said programmable controller and communication parameters from said programmable controller to said output device;

wherein said apparatus data memory serves to store data related to internal processing time of said programmable controller;

wherein said data obtaining means serves to obtain, based on said communication parameters set by said input means, data related to first communication time required for network communication from said input device to said programmable controller and data related to second communication time required for network communication from said programmable control to said output device; and wherein said calculating means serves to obtain said communication times based on the data related to said first communication time and the data related to said second communication time and to obtain said total processing time based on the data related to said internal processing time of said programmable controller, the data related to the internal processing time of said input device, the data related to the internal processing time of said output device, the data on said first communication time and the data on said second communication time.

20. The safety condition setting support device of claim 17 wherein said safety network of said safety system is connected to said input device, said output device and a programmable controller having duplexed operating parts, said input device serving to transmit said danger signal outputted to said safety network to said output device through said programmable controller through said safety network;

wherein said input means serves to set communication parameters from said input device to said programmable controller and communication parameters from said programmable controller to said output device;

wherein said apparatus data memory serves to store data related to internal processing time of said programmable controller;

wherein said data obtaining means serves to obtain, based on said communication parameters set by said input means, data related to first communication time required for network communication from said input device to said programmable controller and data related to second communication time required for network communication from said programmable control to said output device; and wherein said calculating means serves to obtain said communication times based on the data related to said first communication time and the data related to said second communication time and to obtain said total processing time based on the data related to said internal processing time of said programmable controller, the data related to the internal processing time of said input device, the data related to the internal processing time of said output device, the data on said first communication time and the data on said second communication time.

* * * * *